United States Patent
Okazaki et al.

(10) Patent No.: US 6,646,022 B2
(45) Date of Patent: Nov. 11, 2003

(54) PHOTOCURING RESIN COMPOSITIONS, PHOTOCURING SHEETS AND MOLDED ARTICLE USING THE SAME, AND PROCESSES OF PRODUCTION THEREOF

(75) Inventors: Shougo Okazaki, Otake (JP); Yoko Kakuno, Otake (JP); Kenji Suemura, Otake (JP); Hiroyuki Watanabe, Toyama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/897,124

(22) Filed: Jul. 3, 2001

(65) Prior Publication Data

US 2002/0032250 A1 Mar. 14, 2002

(30) Foreign Application Priority Data

Jul. 5, 2000 (JP) .......................... 2000-203809
Jul. 5, 2000 (JP) .......................... 2000-203849
Mar. 30, 2001 (JP) .......................... 2001-101989

(51) Int. Cl.$^7$ .............................. C08F 2/46; C08F 2/48
(52) U.S. Cl. ..................... 522/153; 430/56; 430/60; 522/100; 522/104; 522/149; 522/150; 522/83; 264/494; 264/496; 264/478; 264/446; 264/447; 428/500
(58) Field of Search ...................... 430/56, 60; 522/83, 522/149, 150, 113, 153, 114, 100, 104; 264/494, 496, 478, 446, 447; 428/500

(56) References Cited

U.S. PATENT DOCUMENTS 4,343,919 A  8/1982  Tefertiller et al.
4,506,048 A  3/1985  Bush et al.

FOREIGN PATENT DOCUMENTS

EP  0 451 680  10/1991
WO  WO 93/25596  12/1993

OTHER PUBLICATIONS

Patent Abstract of WIPO, WO 99/44827, Sep. 10, 1999.
Patent Abstract of Japan, JP 60–250925, Dec. 11, 1985.
Patent Abstract of Japan, JP 4–201212, Jul. 22, 1992.

Primary Examiner—James J. Seidleck
Assistant Examiner—Sanza L. McClendon
(74) Attorney, Agent, or Firm—Oblon, Spivak, McClelland, Maier & Neustadt, P.C.

(57) ABSTRACT

A photocuring resin composition comprising a thermoplastic resin (a-1) having a radical polymerizing unsaturated group at its side chain and a photopolymerization initiator (a-2) and substantially not including a crosslinking compound other than (a-1), a photocuring sheet comprising a photocuring resin composition (A) laminated on a substrate sheet (B) and a process of production of the same, a photocuring decorative sheet and photocuring insert molding sheet using the same, and a process of production of a molded article using such a photocuring sheet and an insert molded article obtained by the same.

13 Claims, No Drawings

PHOTOCURING RESIN COMPOSITIONS, PHOTOCURING SHEETS AND MOLDED ARTICLE USING THE SAME, AND PROCESSES OF PRODUCTION THEREOF

BACKGROUND OF THE INVENTION

1. Field of the Invention

The present invention relates to a photocuring resin composition giving a photocuring sheet having a superior appearance, decorativeness, abrasion resistance, chemical resistance, and weather resistance and free from surface tackiness, such photocuring sheets, a molded article using the same, and processes for production of the same.

2. Description of the Related Art

As methods for molding and simultaneously decorating the surface of a plastic product, various methods have been proposed such as (1) the method of giving a pattern to the inner surface of a mold in advance, (2) the method of attaching a transfer film to the inner wall of the mold and transferring the pattern etc. of the film to the outer surface of the molded article at the same time as molding, and (3) the method of adhering a function-imparting sheet or printed sheet to the inner wall of the mold and adhering that sheet to the surface of the molded article at the same time as molding. Regarding the methods of (2) and (3), Japanese Unexamined Patent Publication (Kokai) No. 60-250925, Japanese Examined Patent Publication (Kokoku) No. 59-36841, and Japanese Examined Patent Publication (Kokoku) No. 8-2550 propose the method of forming a weather resistant sheet or printed sheet to the inner wall of the mold, then injection molding a resin to produce a molded article with a surface covered by the sheet.

The above art, however, imparts decoration or functionality by transfer by a thermoplastic sheet or printing, so the surface hardness of the obtained molded article becomes insufficient. For example, when imparting weather resistance to a molded article, it is sufficient to use a high weather resistant sheet made of polyvinylidene fluoride (PVDF) etc., but there is the problem that a sufficient surface hardness cannot be obtained. As opposed to this, when trying to obtain a molded article having a high surface hardness, it has been necessary to use a pre-crosslinked sheet having a high surface hardness. This sheet, however, is difficult to use for molding a three-dimensional molded article.

Therefore, as disclosed in Japanese Examined Patent Publication (Kokoku) No. 7-323, a photocuring sheet obtained by laminating a photocuring resin layer formed by a resin composition including an acrylic resin, a compound having a reactive vinyl group, and a photopolymerization initiator with a sheet substrate has been proposed. With this method, however, the sheet before photocuring contains a low molecular weight compound having a reactive vinyl group, so the surface has tackiness, the tackiness of the surface changes along with time, and other phenomena occur or the storage stability in the roll state becomes poor. Specifically, there was the problem that it would stick and not unwind and, unless stored at a low temperature, the compound would seep out from the two ends. Further, due to the tackiness, trouble occurred in the printing process when used as a printed sheet.

To solve this problem, the inventors previously proposed a photocuring sheet free from tackiness by developing a substrate sheet obtained by laminating a composition comprised of an acrylic resin having an alicyclic epoxy group at its side chain and a photopolymerization initiator. They engaged in intensive studies aiming at achievement of a higher hardness and achievement of a better weather resistance and as a result discovered the present invention.

SUMMARY OF THE INVENTION

An object of the present invention is to provide a photocuring resin composition giving a photocuring sheet superior in abrasion resistance, weather resistance, and chemical resistance and free of tackiness and therefore superior in processability and storage stability and therefore able to be used advantageously for the production of a fancily decorated molded article.

Another object of the present invention is to provide such a photocuring sheet and a process for production of the same.

Still another object of the present invention is to provide a molded article obtained using such a photocuring sheet and a process of production of the same.

According to a first aspect of the present invention, there is provided a photocuring resin composition comprising a thermoplastic resin (a-1) having a radical polymerizing unsaturated group at its side chain and a photopolymerization initiator (a-2) and substantially not comprising a crosslinking compound other than (a-1).

According to a second aspect of the present invention, there is provided a photocuring sheet comprising a substrate sheet (B) and any of the above photocuring resin compositions (A) laminated on the same.

According to a third aspect of the present invention, there is provided a process of production of a photocuring sheet comprising the steps of coating a mixed solution including a photocuring resin composition (A) and solvent on a substrate sheet (B) and heating the coated substrate sheet (B) to cause the solvent to vaporize, wherein the coated substrate sheet (B) is not heated continuously for 20 seconds or more to a temperature equal to or higher than a glass transition temperature of a resin ingredient (b) comprising a main ingredient of the substrate sheet (B).

According to a fourth aspect of the present invention, there is provided a photocuring decorative sheet including at least one of a printed layer and a deposited layer formed on a substrate sheet (B) side of any of the above photocuring sheets.

According to a fifth aspect of the present invention, there is provided a photocuring insert molding sheet comprising at least one of a printed layer and a deposited layer, and an adhesive layer formed on a substrate sheet (B) side of any of the above photocuring sheets.

According to a sixth aspect of the present invention, there is provided a photocuring insert molding sheet comprising at least one of a printed layer and a deposited layer, and an adhesive layer, and a primer sheet formed on a substrate sheet (B) side of any of the above photocuring sheets.

According to a seventh aspect of the present invention, there is provided a process of production of an insert molded article comprising the steps of inserting and arranging any of the above photocuring sheets, any of the above photocuring decorative sheets, or any of the above photocuring insert molding sheets so that the photocuring resin composition side faces the inner wall of a mold, closing the mold, injecting a molten resin into the mold, and allowing the resin to solidify to form a resin molded article with a photocuring sheet, photocuring decorative sheet, or photocuring insert molding sheet arranged on its surface, and irradiating light to photocure the photocuring resin composition on the surface of the molded article.

According to an eighth aspect of the present invention, there is provided a process of production of an insert molded article comprising the steps of inserting and arranging any of the above photocuring sheets, any of the above photocuring decorative sheets, or any of the above photocuring insert molding sheets so that the photocuring resin composition side faces the inner wall of a mold, preliminarily molding the photocuring sheet, photocuring decorative sheet, or photocuring insert molding sheet to make the sheet follow the shape of the mold, closing the mold, injecting a molten resin into the mold, and allowing the resin to solidify to form a resin molded article with a photocuring sheet, photocuring decorative sheet, or photocuring insert molding sheet arranged on its surface, and irradiating light to photocure the photocuring resin composition on the surface of the molded article.

According to a ninth aspect of the present invention, there is provided an insert molded article obtained by any of the above processes of production.

DESCRIPTION OF THE PREFERRED EMBODIMENTS

Preferred embodiments of the present invention will be described in detail next.

The photocuring resin composition of the present invention includes a thermoplastic resin (a-1) having a radical polymerizing unsaturated group at its side chain and a photocuring polymerization initiator (a-2) and does not substantially include a crosslinking compound other than the above (a-1). In the present invention, by laminating a layer of the photocuring resin composition (A) on the substrate sheet (B), it is possible to obtain a photocuring sheet. In the photocuring resin composition of the present invention, by introducing a structure having a radical polymerizing unsaturated group at its polymer side chain, a crosslinking reaction proceeds between the polymer side chains, so a remarkably excellent abrasion resistance is obtained, there is no need for including a low molecular weight crosslinking compound having a reactive vinyl group, and therefore a sheet which has no surface tackiness and is superior in storage stability can be obtained.

As the thermoplastic resin (a-1) having a radical polymerizing unsaturated group at its side chain, for example, one having a radical polymerizing unsaturated group in the polymer and having a glass transition temperature of 25 to 175° C., preferably 30 to 150° C., can be mentioned. Specifically, as the polymer, it is possible to use the following compounds (1) to (8) polymerized or copolymerized and with a radical polymerizing unsaturated group by the following methods (a) to (d):

(1) Monomers having a hydroxyl group: N-methylolacrylamide, 2-hydroxyethyl(meth)acrylate, 2-hydroxypropyl(meth)acrylate, 2-hydroxybutyl(meth)acrylate, 2-hydroxy-3-phenoxypropyl(meth)acrylate, etc.;

(2) Monomers having a carboxyl group: (Meth)acrylic acid, acryloyloxyethylmonosuccinate, etc.;

(3) Monomers having an epoxy group: Glycidyl(meth)acrylate, 3,4-epoxycyclohexylmethyl(meth)acrylate, etc.;

(4) Monomers having an aziridinyl group: 2-aziridinylethyl(meth)acrylate, allyl 2-aziridinylpropionate, etc.;

(5) Monomers having an amino group: (Meth)acrylamide, diacetone acrylamide, dimethylaminoethyl(meth)acrylate, diethylaminoethyl(meth)acrylate, etc.;

(6) Monomers having a sulfone group: 2-acrylamide-2-methylpropanesulfonic acid etc.;

(7) Monomers having an isocyanate group: An addition product of diisocyanate and a radical polymerizing monomer having an active hydrogen such as an equimolar addition product of 2,4-toluenediisocyanate and 2-hydroxyethylacrylate, 2-isocyanate ethyl(meth)acrylate, etc.; and (8) Further, it is possible to copolymerize the above compounds with monomers able to be copolymerized by the same so as adjust the glass transition temperature of the above copolymers or adjust the physical properties of the photocuring sheet. As such a copolymerizable monomer, for example, methyl(meth)acrylate, tricyclodecanyl(meth)acrylate, isobornyl(meth)acrylate, or other (meth)acrylates, N-phenylmaleimide, cyclohexylmaleimide, N-butylmaleimide, and other imide derivatives, butadiene and other olefin-based monomers, styrene, α-methylstyrene, and other aromatic vinyl compounds, etc. may be mentioned.

Next, a radical polymerizing unsaturated group is introduced into the polymer obtained in the above way by one of the methods (a) to (d) explained below:

(a) Causing a condensation reaction of a monomer having a carboxyl group such as (meth)acrylic acid etc. in the case of a polymer or copolymer of a monomer having a hydroxyl group;

(b) Causing a condensation reaction of the above monomer having a hydroxyl group in the case of a polymer or copolymer of a monomer having a carboxyl group or sulfone group;

(c) Causing an addition reaction of the above monomer having a hydroxyl group or monomer having a carboxyl group in the case of a polymer or copolymer of a monomer having an epoxy group, isocyanate group, or aziridinyl group; and (d) Causing an addition reaction of a monomer having an epoxy group or a monomer having an aziridinyl group or a monomer having an isocyanate group or an equimolar addition product of a diisocyanate compound and acrylic acid ester monomer containing a hydroxyl group in the case of a polymer or copolymer of a monomer having a hydroxyl group or carboxyl group.

The above reactions are preferably performed while adding a fine amount of hydroquinone or other polymerization inhibitor and feeding dry air.

The amount of the radical polymerizing unsaturated groups of the side chain of the thermoplastic resin (a-1) is preferably one where the double bond equivalent (average molecular weight per side chain radical polymerizing unsaturated group) is not more than an average 3000 g/mol by value calculated from the charged value from the viewpoint of the improvement of the mar resistance and the abrasion resistance. A more preferable range of the double bond equivalent is not more than an average 1200 g/mol, a more preferable range is not more than an average 600 g/mol, and a most preferable range is not more than an average 400 g/mol.

By introducing a plurality of radical polymerizing unsaturated groups involved in crosslinking into the thermoplastic resin in this way, there is no need to use a crosslinking compound of a low molecular weight, and it becomes possible to improve the cured physical properties efficiently without giving surface tackiness even with the later explained long term storage or at the time of hot molding.

The number average molecular weight of the thermoplastic resin (a-1) is preferably in the range of 5,000 to 2,500,000, more preferably 10,000 to 1,000,000. When insert molding a photocuring sheet formed using a photocuring resin composition (A) including a thermoplastic resin (a-1), the number average molecular weight is preferably at least 5,000 from the viewpoint of good mold release ability and the viewpoint of improvement of the surface hardness of the insert molded article after photocuring. On the other hand, from the viewpoint of the ease of synthesis and appearance and the viewpoint of bonding with the substrate sheet (B), the number average molecular weight is preferably not more than 2,500,000.

Further, the thermoplastic resin (a-1) is preferably adjusted to a glass transition temperature of 25 to 175° C., more preferably is adjusted to 30 to 150° C. From the viewpoint of good mold release ability of the photocuring sheet at the time of insert molding and the viewpoint of improvement of the surface hardness of the insert molded article after photocuring, the glass transition temperature is preferably at least 25° C. On the other hand, from the viewpoint of the handling of the photocuring sheet, the glass transition temperature is preferably not more than 175° C.

If considering the glass transition temperature of the thermoplastic resin copolymer obtained, it is preferable to use a vinyl polymerizing monomer giving a high glass transition temperature as a homopolymer.

Further, from the viewpoint of improvement of the weather resistance of the thermoplastic resin copolymer, it is preferable to use as a vinyl polymerizing monomer an acryl-based resin made using (meth)acrylates as a main ingredient.

Further, as explained later, when adding inorganic particulate (a-3) in the photocuring resin composition (A) of the present invention, a vinyl polymerizing monomer having inside its molecule at least one type of functional group selected from the group of groups able to react with the functional groups (hydroxyl groups, carboxyl groups, silanol groups, etc.) on the surface of the inorganic particulate (a-3), for example, a hydroxyl group, carboxyl group, halogenated silyl group, and alkoxysilyl group works to further improve the rigidity, toughness, heat resistance, and other physical properties of the photocuring resin composition obtained, so may be included as part of the vinyl polymerizing monomer ingredient to which the functional groups can radically polymerize.

As the vinyl polymerizing monomer containing in its molecule such a reactive group, 2-hydroxyethyl(meth) acrylate, 2-hydroxypropyl(meth)acrylate, (meth)acrylic acid, vinyltrichlorosilane, vinyltrimethoxysilane, γ-(meth) acryloyloxypropyltrimethoxysilane, etc. may be mentioned.

As the photopolymerization initiator (a-2) used in the present invention, a photo radical polymerization initiator producing radicals by irradiation of light may be mentioned.

As the photo radical polymerization initiator, it is possible to use a known compound. While not particularly limited, when considering yellowing at the time of curing and the deterioration of the weather resistance, an acetophenone-based, benzophenone-based, acylphosphinoxide-based initiator, or other initiator not containing an amino group in its molecule may be mentioned. For example, 1-(4-dodecylphenyl)-2-hydroxy-2-methylpropan-1-one, 1-hydroxycyclohexylphenylketone, 2-hydroxy-2-methyl-1-phenylpropan-1-one, 1-(4-isopropylphenyl)-2-hydroxy-2-methylpropan-1-one, 2,4,6-trimethylbenzoyldiphenylphosphinoxide, and bis(2,6-dimethoxybenzoyl)-2,4,4-trimethylpentylphosphinoxide are preferable. Among these, caution is required since depending on the molding method, the temperature temporarily becomes more than the boiling point of the compound. To raise the surface hardness of the molded article, an additive, such as n-methyldiethanolamine, which suppresses the action of obstructing polymerization and curing by oxygen may be added. Further, in addition to these photopolymerization initiators, considering the curing using the heat at the time of molding, it is also possible to add various types of peroxides. When including a peroxide in the photocuring sheet, it is necessary to cause curing at 150° C. for about 30 seconds, so a peroxide with a low critical temperature, for example, lauroylperoxide, t-butylperoxy-2-ethylhexanoate, 1,1-bis(t-butylperoxy)-3,3,5-trimethylcyclohexane, etc. are preferably used.

The amount of the photo radical polymerizing initiator added is preferably not more than 5 wt % with respect to the compound having a radical polymerizing unsaturated group at its side chain since the amount remaining after curing has an effect on the weather resistance. In particular, the amount of the amine-based photo radical polymerization initiator related to the yellowing at the time of curing is preferably not more than 1 wt %.

It is possible to add an inorganic particulate (a-3) to the photocuring resin composition (A) of the present invention for the purpose of further improving the mar resistance or the abrasion resistance. The inorganic particulate (a-3) used in the present invention is not particularly limited in type, particle size, or form so long as the photocuring resin composition obtained becomes transparent. As examples of the inorganic particulate, colloidal silica, alumina, titanium oxide, tin oxide, tin oxide doped with a hetero atom (ATO etc.), indium oxide, indium oxide doped with a hetero atom (ITO t etc.), cadmium oxide, antimony oxide, etc. may be mentioned. These may be used alone or in combinations of two or more types. Among these, colloidal silica is particularly preferable from the viewpoint of the ease of acquisition and price and the transparency or abrasion resistance of the photocuring resin composition layer obtained.

The colloidal silica may be used in the form of an ordinary aqueous dispersion or the form of silica dispersed in an organic solvent, but it is preferable to use colloidal silica dispersed in an organic solvent to cause it to be uniformly and stably dispersed along with the thermoplastic resin (a-1).

As such an organic solvent, methanol, isopropyl alcohol, n-butanol, ethylene glycol, xylene/butanol, ethyl cellosolve, butyl cellosolve, dimethylformamide, dimethylacetoamide, methylethylketone, methylisobutylketone, toluene, etc. may be mentioned. Among these, to cause uniform dispersion with the thermoplastic resin, it is preferable to select an organic solvent which can dissolve the thermoplastic resin (a-1). As explained later, when producing the photocuring sheet of the present invention, the organic solvent is vaporized by the heating and drying, so an organic solvent having a boiling point 80° C. or more higher than the glass transition temperature of the resin ingredient (b) constituting the main ingredient of the substrate sheet (B), preferably 30° C. or more higher, is not preferred since it easily remains in the photocuring sheet.

As the colloidal silica of a type dispersed in an organic solvent, it is possible to use a commercially available product dispersed in a dispersion solvent, for example, Methanol Silica Sol MA-ST, Isopropyl Alcohol Silica Sol IPA-ST, n-Butanol Silica Sol NBA-ST, Ethylene Glycol Silica Sol EG-ST, Xylene/Butanol Silica Sol XBA-ST, Ethyl Cellosolve Silica Sol ETC-ST, Butyl Cellosolve Silica Gel BTC-ST, Dimethylformamide Silica Sol DBF-ST, Dimethylacetoamide Silica Sol DMAC-ST, Methylethylketone Silica Sol MEK-ST, Methylisobutylketone Silica Sol MIBK-ST (above all names of products made by Nissan Chemical Industries) etc.

The particle size of the inorganic particulate (a-3) is normally not more than 200 nm from the viewpoint of the transparency of the photocuring resin composition layer obtained. More preferably it is not more than 100 nm, more particularly not more than 50 nm.

The amount of the inorganic particulate (a-3) added is preferably in a range of 5 to 400 parts by weight solid content of the inorganic particulate, particularly preferably a range of 10 to 200 parts by weight, with respect to 100 parts by weight solid content of the thermoplastic resin (a-1) having a radical polymerizing unsaturated group at its side chain. If the amount of the inorganic particulate added is less than 5 parts by weight, no effect in improvement of the abrasion resistance can be recognized. If the amount added is more than 400 parts by weight, not only does the storage stability of the photocuring resin composition (A) fall, but also the moldability of the photocuring sheet obtained sometimes falls.

As the inorganic particulate (a-3) used in the present invention, it is possible to use one treated on its surface in advance by a silane compound of the following structural formula (2). Use of surface-treated inorganic particulate is preferable in that the storage stability of the photocuring resin composition (A) becomes even better and the surface hardness and weather resistance of the photocuring sheet obtained become good as well.

$$SiR^1{}_aR^2{}_b(OR^3)_c \qquad (2)$$

(wherein, $R^1$ and $R^2$ indicate $C_1$ to $C_{10}$ hydrocarbon residues which may have ether bonds, ester bonds, epoxy bonds, or carbon—carbon double bonds, $R^3$ indicates a hydrogen atom or a $C_1$ to $C_{10}$ hydrocarbon residue which may have an ether bond, ester bond, epoxy bond, or carbon—carbon double bond, a and b indicate integers of 0 to 3, and c indicates an integer of 1 to 4 satisfying 4-a-b).

Among the silane compounds of the structural formula (2), it is possible to mention silane compounds of the following structural formulas (3) to (8) as preferable compounds:

$$SiR^4{}_aR^5{}_b(OR^6)_c \qquad (3)$$

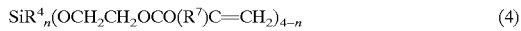
$$SiR^4{}_n(OCH_2CH_2OCO(R^7)C{=}CH_2)_{4-n} \qquad (4)$$

$$CH_2{=}C(R^7)COO(CH_2)_pSiR^8{}_n(OR^6)_{3-n} \qquad (5)$$

$$CH_2{=}CHSiR^8{}_n(OR^6)_{3-n} \qquad (6)$$

$$HS(CH_2)_pSiR^8{}_n(OR^6)_{3-n} \qquad (7)$$

$$(8)$$

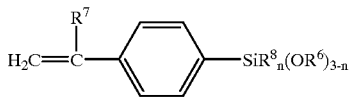

(wherein, $R^4$ and $R^5$ indicate $C_1$ to $C_{10}$ hydrocarbon residues which may have ether bonds, ester bonds, or epoxy bonds, $R^6$ indicates a hydrogen atom or a $C_1$ to $C_{10}$ hydrocarbon residue, $R^7$ indicates a hydrogen atom or methyl group, $R^8$ indicates a $C_1$ to $C_3$ alkyl group or phenyl group, a and b indicate integers of 0 to 3, c indicates an integer of 1 to 4 satisfying 4-a-b, n indicates an integer of 0 to 2, and p indicates an integer of 1 to 6).

As the silane compound of the structural formula (3), for example, tetramethoxysilane, tetraethoxysilane, tetrapropoxysilane, tetrabutoxysilane, methyltrimethoxysilane, methyltriethoxysilane, ethyltrimethoxysilane, ethyltriethoxysilane, phenyltrimethoxysilane, phenyltriethoxysilane, dimethyldimethoxysilane, diphenyldimethoxysilane, methylethyldiethoxysilane, methylphenyldimethoxysilane, trimethylethoxysilane, methoxyethyltriethoxysilane, acetoxyethyltriethoxysilane, diethoxyethyldimethoxysilane, tetracetoxysilane, methyltriacetoxysilane, tetrakis(2-methoxyethoxy)silane, γ-glycidoxypropyltrimethoxysilane, γ-glycidoxypropylmethyldiethoxysilane, β-(3,4-epoxycyclohexyl)ethyltrimethoxysilane, etc. may be mentioned.

As the silane compound of the structural formula (4), for example, tetrakis(acryloyloxyethoxy)silane, tetrakis(methacryloyloxyethoxy)silane, methyltris(acryloyloxyethoxy)silane, methyltris(methacryloyloxyethoxy)silane, etc. may be mentioned.

As the silane compound of the structural formula (5), for example, β-acryloyloxyethyldimethoxymethylsilane, γ-acryloyloxypropylmethoxydimethylsilane, γ-acryloyloxypropyltrimethoxysilane, β-methacryloyloxyethyldimethoxymethylsilane, γ-methacryloyloxypropyltrimethoxysilane, etc. may be mentioned.

As the silane compound of the structural formula (6), for example, vinylmethyldimethoxysilane, vinyltrimethoxysilane, vinyltriethoxysilane, etc. may be mentioned.

As the silane compound of the structural formula (7), for example, γ-mercaptopropyldimethoxymethylsilane, γ-mercaptopropyltrimethoxysilane, etc. may be mentioned.

As the silane compound of the structural formula (8), for example, p-vinylphenylmethyldimethoxysilane, p-vinylphenyltrimethoxysilane, etc. may be mentioned.

The silane compound is preferably used in a ratio of 0 to 3 moles with respect to 1 mole solid content of the inorganic particulate (a-3). If the amount of the silane compound used is more than 3 moles, the abrasion resistance of the photocuring sheet obtained sometimes falls.

The inorganic particulate surface treated by the silane compound may be obtained by using a commercially available product or by treating the surface of the inorganic particulate by a known method. As a known surface treated method, there is the method for example of treatment by heating and stirring a silane compound and inorganic particulate in the presence of a small amount of water.

As a method for adding an inorganic particulate (a-3) to a thermoplastic resin (a-1) having a radical polymerizing unsaturated group in its side chain, it is possible to select any method such as the method of synthesizing the thermoplastic resin (a-1) in advance, then mixing in the inorganic particulate or polymerizing the thermoplastic resin under conditions mixing the vinyl polymerizing monomer making up the thermoplastic resin (a-1) and inorganic particulate.

In the photocuring resin composition (A) able to be used in the present invention, it is possible to mix the essential ingredients of the thermoplastic resin (a-1) and photopolymerization initiator (a-2) and the above-mentioned inorganic particulate (a-3) plus, when needed, additives such as a sensitizing agent, modifying resin, dye, pigment, leveling agent, anti-cissing agent, UV absorbent, photo stabilizer, or oxidation stabilizer.

The sensitizing agent promotes the photocuring reaction. As an example, benzophenone, benzoin isopropyl ether, thioxanthone, etc. may be mentioned.

The photocuring resin composition (A) should not include substantially any crosslinking compound other than the above thermoplastic resin (a-1). In particular, a crosslinking monomer or oligomer liquid at 40° C. or a crosslinking monomer or oligomer of a low molecular weight of not more than 2000 should not be substantially contained. In particular, if a crosslinking monomer or oligomer liquid at 40° C. or a crosslinking monomer or oligomer of a low molecular weight of not more than 2000 is contained, there are the problems that there is surface tackiness at the time of long-term storage or hot molding, problems arise in the printing process, and the mold is contaminated at the time of insert molding. More preferably, a crosslinking monomer or oligomer liquid at 50° C. should not be substantially contained. More preferably, a crosslinking monomer or oligomer liquid at 60° C. should not be substantially contained.

In the present invention, since the photocuring resin composition (A) is used, even when the photocuring resin composition is laminated on the substrate sheet (B) to form a photocuring sheet, the surface of the photocuring sheet is free from tackiness, phenomena such as a change in the surface tackiness along with time do not occur, and the storage stability in the roll state becomes excellent.

The photocuring resin composition (A) may further include an electroconductive filler. By including an electroconductive filler, it is possible to impart superior electroconductivity or electromagnetic shielding in addition to mar resistance and chemical resistance to the photocuring resin composition or photocuring sheet of the present invention. It is possible to use the composition for applications requiring electroconductivity and electromagnetic shielding such as displays or other members of AV equipment or home electrical appliances, transport containers or storage containers of semiconductor wafers, interior and exterior materials for clean rooms such as operating rooms, electronic device manufacturing rooms, and biotechnology laboratories, transparent electrodes, window materials of solar batteries, heat ray reflecting films, visible external light absorption films, electromagnetic shielding films, etc.

The type, particle size, and form of the electroconductive filler used are not particularly limited. It is possible to use any of an organic electroconductive filler and inorganic electroconductive filler.

As an organic electroconductive filler, for example, a quaternary ammonium salt, pyridinium salt, various types of cationic organic electroconductive fillers having cationic groups such as primary to tertiary amino groups, various types of anionic organic electroconductive fillers having anionic groups such as a sulfonate base, sulfuric acid ester base, phosphoric acid ester base, or phosphoric acid base, bipolar organic electroconductive fillers such as amino acid-based and aminosulfuric acid ester-based fillers, nonionic organic electroconductive fillers such as amino alcohol-based, glyceryl-based, and polyethyleneglycol-based fillers may be mentioned.

Further, polymerizing organic electroconductive fillers such as monomers or oligomers having tertiary amino groups or quaternary ammonium groups and polymerizable by dissociating radiation etc. (for example, N,N-dialkylaminoalkyl(meth)acrylate etc.) and their quaternary compounds may also be used. Further, an electroconductive resin such as polyaniline, polyacetylene, or polypyrrole may naturally be used.

As the inorganic electroconductive filler, for example, an electroconductive metal oxide such as antimony-doped tin oxide (ATO), phosphorus-doped tin oxide, antimony oxide, zinc antimonate, titanium oxide, and ITO (indium tin oxide), electroconductive metals such as gold, silver, copper, zinc, aluminum, iron, and nickel, or carbons such as furnace black, ketine black, acetylene black, carbon fiber, carbon whiskers, graphite, and carbon black, etc. may be mentioned.

Further, inorganic powders such as silica, kaolin, talc, mica, barium sulfate, and titanium oxide, resin fibers such as nylon yarn and polyester yarn, fibrous inorganic substances such as potassium titanate, potassium titanate aluminate, magnesium borate, aluminum borate, titania, wollastonite, xonotlite, and silicon nitride coated on the surface with an electroconductive layer of an electroconductive metal oxide, electroconductive metal, or carbon to form a powder or fibrous substance may also be mentioned as an electroconductive filler.

Further, the surface of the electroconductive filler may be treated by a known surface treatment agent such as a nonionic surfactant, cationic surfactant, anionic surfactant, silane coupling agent, titanate coupling agent, or aluminum coupling agent.

These electroconductive fillers each have their advantages and disadvantages, so should be suitably selected by the manufacturer. In particular, when trying to achieve both transparency and a high electroconductivity in the layer of the photocuring resin composition (A) obtained, it is preferable to use electroconductive particulate of an average primary particle size of not more than 100 nm as an electroconductive filler, more particularly electroconductive particulate of an average primary particle size of not more than 50 nm. As such an electroconductive particulate, it is possible to use various types of electroconductive fillers having average primary particle sizes of not more than 100 nm, but among these, particulate of electroconductive metal oxides such as ATO, phosphorus-doped tin oxide, antimony oxide, zinc antimonate, titanium oxide, and ITO and electroconductive metal particulate such as gold, silver, and copper are particularly preferable from the viewpoint of imparting transparency to the photocuring resin composition (A) and imparting a stable electroconductivity not affected by external factors (humidity etc.) The electroconductive particulate may be produced by for example vapor phase thermal cracking, plasma vaporization, alkoxide cracking, coprecipitation, hydrothermal reaction, etc.

From the viewpoint of the transparency of the photocuring resin composition (A), as the electroconductive particulate, it is preferable to use the electroconductive particulate in a form dispersed in an aqueous solvent or organic solvent. For uniform and stable dispersion along with the thermoplastic resin of the ingredient (a-1), it is preferable to use an electroconductive particulate dispersed in an organic solvent.

As such an organic solvent, methanol, isopropyl alcohol, n-butanol, ethylene glycol, xylene/butanol, ethyl cellosolve, butyl cellosolve, dimethylformamide, dimethylacetamide, methylethylketone, methylisobutylketone, toluene, etc. may be mentioned. Among these, for uniform dispersion along with the thermoplastic resin (a-1), it is preferable to select an organic solvent able to dissolve the thermoplastic resin (a-1), but as mentioned later, when producing the photocuring sheet of the present invention, the organic solvent is heated to vaporize it, so an organic solvent having a boiling point 80° C. or more higher than the glass transition temperature of the resin ingredient (b) constituting the main ingredient of the substrate sheet (B), preferably more than 30° C. higher, is not preferred since it easily remains in the photocuring sheet.

The amount of the electroconductive material added is preferably in the range of 1 to 300 parts by weight with respect to 100 parts by weight solid content of the thermoplastic resin (a-1), more preferably a range of 2 to 250 parts by weight. If the amount of the electroconductive filler added is less than 1 part by weight, no effect of imparting electroconductivity can be recognized. Further, if the amount added is more than 300 parts by weight, not only does the storage stability of the photocuring resin composition (A) fall, but also the moldability, transparency, and strength of the photocuring sheet obtained sometimes fall.

As the method for adding the electroconductive filler to the thermoplastic resin (a-1) having a photopolymerizing functional group at its side chain, it is also possible to select any method such as the method of polymerizing the thermoplastic resin (a-1) in advance, then mixing in the electroconductive filler or polymerizing the thermoplastic resin (a-1) under conditions mixing the vinyl polymerizing monomer making up the thermoplastic resin (a-1) and electroconductive filler.

As the substrate sheet (B) used in the present invention, a suitable one is selected according to the method of use without regard as to transparency or nontransparency, but for example a sheet comprised of an ABS (acrylonitrile/butadiene/styrene copolymer)-based resin, AS (acrylonitrile/styrene copolymer)-based resin, vinyl chloride-based resin, polystyrene-based resin, and a polyolefin-based resin such as polypropylene, a fluororesin, cellophane resin, cellulose-based resin, polyurethane-based resin, polyamide-based resin such as nylon, polyester-based resin, polycarbonate-based resin, polyvinyl alcohol-based resin, soft acryl-based resin, or other material may be mentioned. Further, it is possible to use composites, laminates, etc. of these sheets. In particular, a thermoplastic resin sheet having an elongation of at least 100% when heating to 100° C. is preferable since the ability to follow the shape of the mold at the time of insert molding becomes excellent. Considering the bondability with the photocuring resin composition (A), weather resistance, transparency, etc., more preferably it is a thermoplastic acrylic resin sheet having a crosslinking rubber ingredient. As the transparent thermoplastic acrylic resin sheet having a crosslinking rubber ingredient, there is the transparent thermoplastic acrylic sheet as disclosed in Japanese Unexamined Patent Publication (Kokai) No. 8-323934, Japanese Unexamined Patent Publication (Kokai) No. 9-263614, etc.

When the thickness of the substrate sheet (B) is over 500 μm, the rigidity becomes large, which is not preferable for an insert molding sheet, so ordinarily the thickness of the substrate sheet is not more than 500 μm.

Further, the substrate sheet (B) may have added to it, in accordance with need, various additives such as lubricants such as polyethylene wax or paraffin wax, lubricants such as silica, spherical alumina, and flake alumina, UV absorbents such as benzotriazole-based, benzophenone-based, and particulate cerium oxide-based absorbents, photo stabilizing agents such as hindered amine-based radical trapping agents, plasticizers, and coloring agents.

The photocuring sheet of the present invention, by having the above configuration, is a photocuring sheet achieving a high level of excellence of moldability and storage stability before photocuring and surface properties after photocuring (hardness, weather resistance, etc.) As explained later, normally the photocuring sheet of the present invention is produced by coating a solution obtained by mixing and dissolving the photocuring resin composition (A) in a solvent such as an organic solvent on the substrate sheet (B) by various coating methods, then heating and drying the sheet to remove the solvent. At this time, if the solvent remains in a large amount in the photocuring sheet, the surface of the photocuring resin composition (A) before irradiation by light has tackiness, the yield in the printing process falls, the storage stability in the roll state falls, or the mold is contaminated at the time of insert molding. Further, even if photocuring an insert molded article obtained by insert molding the photocuring sheet, the surface physical properties such as the mar resistance, chemical resistance, and weather resistance sometimes deteriorate. To solve this problem, the amount of the solvent in the photocuring resin composition (A) defined by the amount of the solvent in the photocuring sheet, the thickness of the photocuring resin composition layer, and the thickness of the substrate sheet has to be not more than a specific numerical value.

Here, the value of an amount of solvent (X) in the photocuring resin composition (A) of the present invention is a numerical value expressed by the following equation (1):

$$X = Y/(a/(a+b)) \tag{1}$$

where,

X: Amount of solvent in the photocuring resin composition (A) per unit weight of photocuring sheet a: Thickness ($\mu$) of photocuring resin composition (A) layer b: Thickness ($\mu$) of substrate sheet (B)

Y: Amount of solvent per unit weight of photocuring sheet

In the present invention, the amount of solvent (X) of the photocuring resin composition (A) may be measured by techniques normally used for quantitative analysis of volatile substances. For example, it may be measured by the following method. First, the thickness (a) of the photocuring resin composition (A) and the thickness (b) of the substrate sheet (B) are measured. The thicknesses (a) and (b) may be measured by the method of observing the sectional shape of the photocuring sheet by an electron microscope. Next, a sample of the photocuring sheet of a suitable size is weighed, then the sheet sample is mixed and stirred in a predetermined amount of a suitable extraction solvent and allowed to stand for a suitable time after sealing the container to prevent evaporation of the solvent. As the extraction solvent, a type different from a solvent which can remain in the photocuring sheet and which completely dissolves or partially dissolves and swells the photocuring sheet is preferred. Next, the amount of solvent in the mixed solution is measured by an analytical method such as gas chromatography and the amount of solvent (Y) remaining in the photocuring sheet per unit weight is calculated. The values of the finally obtained (a), (b), and (Y) are entered into the above formula (1) to calculate the amount of solvent (X) in the photocuring resin composition (A) per unit weight of the photocuring sheet.

The amount of solvent (X) in the photocuring resin composition (A) per unit weight of the photocuring sheet is preferably not more than 10, more preferably not more than 5, still more preferably not more than 3. When the amount of solvent (X) is over 10, the surface of the photocuring resin composition (A) layer before irradiation by light has tackiness and sometimes problems in the printing process, a drop in the storage stability in the roll state, contamination of the mold, a drop in the mar resistance, chemical resistance, and weather resistance of the photocuring resin composition (A) after photocuring, etc. arise.

Further, the photocuring sheet of the present invention may contain at least one layer of photocuring resin composition (C) between the substrate sheet (B) and the layer of the photocuring resin composition (A). The photocuring resin composition (C) layer between the substrate sheet (B) and the outermost photocuring resin composition (A) layer is not particularly limited so long as it has a bondability with the substrate sheet (B) and photocuring resin composition (A) layer sufficient to pose no practical problem and does not detract from the processability and storage stability of the photocuring sheet of the present invention and the appearance, decorativeness, abrasion resistance, chemical resistance, and weather resistance of the sheet after photocuring.

By introducing the photocuring resin composition (C) layer, there is the advantage that even a combination of a substrate sheet (B) with inherently poor bondability and a photocuring resin composition (A) layer can be used for the photocuring sheet of the present invention. Further, when using a photocuring resin composition (A) with an extremely high surface hardness after photocuring, the difference in thermal expansion coefficients between the substrate sheet (B) and the cured layer of the photocuring resin composition (A) becomes extremely great and the weather resistance etc. sometimes fall, but by adjusting the hardness of the cured layer of the photocuring resin composition (C) (generally adjusting it between the substrate sheet (B) and the cured layer of the photocuring resin composition (A)), there is the advantage that it becomes possible to prevent a drop in the weather resistance.

If a composition similar to the photocuring resin composition (A) is used as the photocuring resin composition (C), the surface properties of the photocuring sheet after photocuring (in particular the bondability, weather resistance, appearance, and decorativeness) tend to become excellent. Due to this, the photocuring resin composition (C) preferably includes a thermoplastic resin (c-1) having a radical polymerizing unsaturated group at its side chain and photopolymerization initiator (c-2) as essential ingredients. Further, when considering the handling and work efficiency when producing the photocuring sheet of the present invention, it is preferable that the surface of the photocuring resin composition (C) layer not have tackiness, so the photocuring resin composition (C) more preferably does not substantially contain any crosslinking compound other than the above (c-1).

The thermoplastic resin (c-1) having a radical polymerizing unsaturated group at its side chain in the photocuring resin composition (C) can be synthesized by a method similar to the thermoplastic resin (a-1) having a radical polymerizing unsaturated group at its side chain.

The amount of the radical unsaturated groups of the side chain in the thermoplastic resin (c-1) before photocuring is one by which the double bond equivalent (average molecular weight per side chain radical polymerizing unsaturated group) becomes not more than an average 4000 g/mol by value calculated from the charged value from the viewpoint of the improvement of the mar resistance, abrasion resistance, and bondability. The more preferable range of the double bond equivalent is not more than an average 1200 g/mol, more preferably not more than an average 700 g/mol.

By introducing a plurality of functional groups contributing to crosslinking, it becomes possible to efficiently improve the cured physical properties without causing tackiness even at the time of long term storage or hot molding explained later.

The number average molecular weight of the thermoplastic resin (c-1) before photocuring is preferably in the range of 5,000 to 2,500,000, more preferably in the range of 10,000 to 1,000,000. When insert molding a photocuring sheet using as the intermediate layer a photocuring resin composition (C) including the thermoplastic resin (c-1), the number average molecular weight is preferably at least 5,000 from the viewpoint of the increased difficulty of adhesion of the photocuring sheet to the mold by preheating at the time of molding and the viewpoint of improvement of the surface hardness of the insert molded article after photocuring. On the other hand, from the viewpoint of the ease of synthesis and appearance and the viewpoint of bonding with the substrate sheet (B) and the photocuring resin composition (A), the number average molecular weight is preferably not more than 2,500,000.

Further, the thermoplastic resin (c-1) before photocuring is preferably adjusted to a glass transition temperature of 25 to 175° C., more preferably is adjusted to 30 to 150° C. From the viewpoint of the improvement of the surface hardness of the insert molded article after photocuring, the glass transition temperature is preferably not less than 25° C. On the other hand, from the viewpoint of the handling of the photocuring sheet, the glass transition temperature is preferably not more than 175° C.

Further, considering the glass transition temperature of the thermoplastic resin copolymer obtained, it is preferable to use a vinyl polymerizing monomer having a high glass transition temperature as a homopolymer.

Further, from the viewpoint of improvement of the weather resistance of the thermoplastic resin copolymer, it is preferable to use a (meth)acrylate as the vinyl polymerizing monomer.

Further, as explained later, when using an inorganic particulate (c-3) as one ingredient of the photocuring resin composition (C), a vinyl polymerizing monomer having in its molecule at least one functional group selected from groups able to react with the functional groups on the surface of the inorganic particulate (c-3), for example, a hydroxyl group, carboxyl group, halogenated silyl group, and alkoxysilyl group, works to better improve physical properties such as the rigidity, toughness, and heat resistance of the photocuring resin composition (C) obtained and further the physical properties of the insert molded article after photocuring, so the functional groups may also be included as part of the vinyl polymerizing monomer ingredient which such functional groups may radically polymerize with.

As the vinyl polymerizing monomer containing such a reactive group in its molecule, 2-hydroxyethyl(meth)acrylate, 2-hydroxypropyl(meth)acrylate, (meth)acrylic acid, vinyltrichlorosilane, vinyltrimethoxysilane, γ-(meth)acryloyloxypropyltrimethoxysilane, γ-(meth)acryloyloxypropyldimethoxymethylsilane, etc. may be mentioned.

The thermoplastic resin (c-1) in the photocuring resin composition (C) does not necessarily have to be the same composition as the thermoplastic resin (a-1) in the photocuring resin composition (A). Considering the physical properties of the photocuring sheet before irradiation by light and the physical properties of the insert molded article after irradiation by light, it should be suitably selected in the above range.

As the photopolymerization initiator (c-2) used in the present invention, a photo radical polymerization initiator generating radicals by irradiation of light may be mentioned. It is possible to use one similar to the above-mentioned photopolymerization initiator (a-2). Further, to raise the surface hardness of the molded article, it is also possible to add an additive such as n-methyldiethanolamine suppressing barriers to polymerization and curing by oxygen. Further, in addition to a photopolymerization initiator, considering the curing using the heat at the time of molding, it is also possible to add various types of peroxides. When including a peroxide in the photocuring sheet, it is necessary to cure at 150° C. for about 30 seconds, so a peroxide of a low critical temperature, for example, lauroylperoxide, t-butylperoxy-2-ethylhexanoate, 1,1-bis(t-butylperoxy)-3,3, 5-trimethylcyclohexane, etc. is preferably used.

The amount of the photo radical polymerization initiator (c-2) added is preferably not more than 5 wt % with respect to the compound having a radical polymerizing unsaturated group at its side chain since the amount remaining after curing has an effect on the weather resistance. In particular, the amount of the amino-based photo radical polymerization initiator related to yellowing at the time of curing is preferably not more than 1 wt %.

The photopolymerization initiator (c-2) in the photocuring resin composition (C) does not necessarily have to be the same or the same amount added as the photopolymerization initiator (a-2) in the photocuring resin composition (A). Considering the physical properties of the photocuring sheet before irradiation by light and the physical properties of the insert molded article after irradiation by light, it should be suitably selected in the above range.

In the photocuring resin composition (C) used in the present invention, other than the thermoplastic resin (c-1) and photopolymerization initiator (c-2), if necessary, it is possible to mix in an additive such as a sensitizing agent, modifying resin, dye, pigment, leveling agent, anti-cissing agent, UV absorbent, photo stabilizer, and oxidation stabilizer.

The above sensitizing agent promotes the curing reaction. As an example, benzophenone, benzoinisopropylether, thioxanthone, etc. may be mentioned.

The photocuring resin composition (C) however should not substantially contain any crosslinking compound other than a thermoplastic resin (c-1). In particular, it should substantially not contain a monomer or oligomer liquid at 40° C. or a crosslinking monomer or oligomer of a low molecular weight of not more than 2000. If containing a monomer or oligomer liquid at 40° C. or a crosslinking monomer or oligomer of a low molecular weight of not more than 2000, there is tackiness at the time of long term storage or hot molding, problems arise in the printing process, the mold is contaminated at the time of insert molding, and other problems arise. More preferably, it should substantially not contain a monomer or oligomer liquid at 50° C., more preferably a monomer or oligomer liquid at 60° C.

Further, the photocuring resin composition (C) making up the intermediate layer of the photocuring sheet of the present invention may also contain inorganic particulate (c-3) with the objective of improving the abrasion resistance, mar resistance, or surface hardness of the insert molded article after photocuring.

The inorganic particulate (c-3) able to be used in the present invention is not particularly limited in type or particle size so long as the cured layer of the photocuring resin composition (C) obtained becomes transparent. As an example of an inorganic particulate, colloidal silica, alumina, titanium oxide, tin oxide, tin oxide doped with a hetero atom (ATO etc.), indium oxide, indium oxide doped with a hetero atom (ITO etc.), cadmium oxide, antimony oxide, etc. may be mentioned. These may be used alone or may be used in combinations of two or more types. Among these, colloidal silica is particularly preferable from the viewpoint of the ease and price of acquisition and the transparency and abrasion resistance of the obtained layer of the photocuring resin composition.

The colloidal silica may be used in the form of an ordinary aqueous dispersion or a form dispersed in an organic solvent, but it is preferable to use colloidal silica dispersed in an organic solvent to cause it to be uniformly and stably dispersed along with the thermoplastic resin (c-1).

As such an organic solvent, methanol, isopropyl alcohol, n-butanol, ethylene glycol, xylene/butanol, ethyl cellosolve, butyl cellosolve, dimethylformamide, dimethylacetoamide, methylethylketone, methylisobutylketone, toluene, etc. may be mentioned. Among these, to cause uniform dispersion with the thermoplastic resin (c-1), it is preferable to select an organic solvent which can dissolve the thermoplastic resin (c-1). As explained later, when producing the photocuring sheet of the present invention, the organic solvent is vaporized by the heating and drying, so an organic solvent having a boiling point 80° C. or more higher than the glass transition temperature of the resin ingredient (b) constituting the main ingredient of the substrate sheet (B), preferably more than 30° C. higher, is not preferred since it easily remains in the photocuring sheet.

As the colloidal silica of a type dispersed in an organic solvent, it is possible to use a commercially available product dispersed in a dispersion solvent, for example, Methanol Silica Sol MA-ST, Isopropyl Alcohol Silica Sol IPA-ST, n-Butanol Silica Sol NBA-ST, Ethyleneglycol Silica Sol EG-ST, Xylene/Butanol Silica Sol XBA-ST, Ethyl Cellosolve Silica Sol ETC-ST, Butyl Cellosolve Silica Gel BTC-ST, Dimethylformamide Silica Sol DBF-ST, Dimethylacetoamide Silica Sol DMAC-ST, Methylethylketone Silica Sol MET-ST, Methylisobutylketone Silica Sol MIBK-ST (above all names of products made by Nissan Chemical Industries) etc.

The particle size of the inorganic particulate (c-3) is normally not more than 200 nm from the viewpoint of the transparency of the photocuring resin composition (C) layer obtained. More preferably it is not more than 100 nm, particularly not more than 50 nm.

The amount of the inorganic particulate (c-3) added is preferably in a range of 5 to 400 parts by weight solid content of the inorganic particulate, particularly preferably a range of 10 to 200 parts by weight, with respect to 100 parts by weight solid content of the thermoplastic resin (c-1) having a radical polymerizing unsaturated group at its side chain. If the amount of the inorganic particulate added is less than 5 parts by weight, no effect in improvement of the abrasion resistance can be recognized. If the amount added is more than 400 parts by weight, not only does the storage stability of the photocuring resin composition (C) fall, but also the moldability of the photocuring sheet obtained sometimes falls.

As the inorganic particulate (c-3) used in the present invention, it is possible to use one treated on its surface in advance by a silane compound of the structural formula (2), preferably the structural formulas (3) to (8). Use of surface treated inorganic particulate is preferable in that the storage stability of the photocuring resin composition (C) becomes even better and the surface hardness and weather resistance of the photocuring sheet obtained become good as well.

The silane compound may be used in a ratio of 0 to 3 moles with respect to 1 mole solid content of the inorganic particulate (c-3). If the amount of the silane compound used is more than 3 moles, the abrasion resistance of the photocuring sheet obtained sometimes falls.

The inorganic particulate surface treated by the silane compound may be obtained by using a commercially available product or by treating the surface of the inorganic particulate by a known method. As a known surface treatment method, there is the method for example of treatment by heating and stirring a silane compound and inorganic particulate in the presence of a small amount of water.

As a method for adding an inorganic particulate (c-3) to a thermoplastic resin (c-1) having a radical polymerizing unsaturated group in its side chain, it is possible to select any method such as the method of synthesizing the thermoplastic resin (c-1) in advance, then mixing in the inorganic particulate or polymerizing the thermoplastic resin (c-1) under conditions mixing the vinyl polymerizing monomer making up the thermoplastic resin (c-1) and inorganic particulate.

The inorganic particulate (c-3) in the photocuring resin composition (C) does not necessarily have to be the same or the same amount added as the inorganic particulate (a-3) in the photocuring resin composition (A). Considering the physical properties of the photocuring sheet before irradiation by light and the physical properties of the insert molded article after irradiation by light, it should be suitably selected in the above range.

As the method of producing the photocuring sheet of the present invention comprised of the substrate sheet (B) and photocuring resin composition (A) layer, for example, there is the method of fully mixing and dissolving the essential ingredient of the photocuring resin composition (A) including a thermoplastic resin (a-1) having a radical polymerizing unsaturated group and photopolymerization initiator (a-2) and, if necessary, an inorganic particulate (a-3) in a solvent such as an organic solvent, coating it on the substrate sheet (B) by a known printing method such as gravure printing, screen printing, and offset printing or a known coating method such as flow coating, spray coating, bar coating, gravure coating, roll coating, blade coating, rod coating, roll doctor coating, air knife coating, comma roll coating, reverse roll coating, transfer roll coating, kiss roll coating, curtain coating, and dipping coating, and heating and drying it for removal of the solvent to obtain a laminated sheet.

The solvent for stirring and dissolving the photocuring resin composition (A) is not particularly limited so long as it is a volatile solvent dissolving or uniformly dispersing various ingredients of the photocuring resin composition (A) and not having a seriously detrimental effect on the physical properties of the substrate sheet (B) in practice (mechanical strength, transparency, etc.) and having a boiling point lower than the glass transition temperature of the resin ingredient (b) constituting the main ingredient of the substrate sheet (B) plus 80° C., preferably plus 30° C. As such a solvent, an alcohol-based solvent such as methanol, ethanol, isopropyl alcohol, n-butanol, or ethylene glycol; an aromatic based solvent such as xylene, toluene, or benzene; an aliphatic hydrocarbon-based solvent such as hexane or pentane; a halogenated hydrocarbon-based solvent such as chloroform or carbon tetrachloride; a phenol-based solvent such as phenol or cresol; a ketone-based solvent such as methylethylketone, methylisobutylketone, and acetone; an ether-based solvent such as diethylether, methoxytoluene, 1,2-dimethoxyethane, 1,2-dibutoxyethane, 1,1-dimethoxymethane, 1,1-dimethoxyethane, 1,4-dioxane, and THF; an aliphatic acid-based solvent such as formic acid, acetic acid, or propionic acid; an acid anhydride-based solvent such as anhydrous acetic acid; an ester-based solvent such as ethyl acetate, butyl acetate, or butyl formate; a nitrogen-containing solvent such as ethylamine, tolidine, dimethylformamide, or dimethylacetoamide; a sulfur-containing solvent such as thiophene or dimethylsulfoxide; solvents having two or more types of functional groups such as diacetone alcohol, 2-methoxyethanol(methylcellosolve), 2-ethoxyethanol(ethylcellosolve), 2-butoxyethanol (butylcellosolve), diethyleneglycol, 2-aminoethanol, acetocyanohydrin, diethanolamine, or morpholine; or various known solvents such as water.

When including one or more layers of the photocuring resin composition (C) between the substrate sheet (B) and the photocuring resin composition (A), there is the method of sufficiently stirring and dissolving the photocuring resin composition (C) in a solvent such as an organic solvent, coating it on the substrate sheet (B) by a known printing method or coating method in the same way as above, drying to remove the solvent, then sufficiently stirring and dissolving the photocuring resin composition (A) in an organic solvent etc. in the same way, coating it on the photocuring resin composition (C) layer on the substrate sheet (B) by a known method in the same way, and drying to remove the solvent so as to obtain a laminated sheet. At this time, before forming the photocuring resin composition (A) layer, it is also possible irradiate light on the dried photocuring resin composition (C) layer using an UV lamp etc. to photocure the photocuring resin composition (C) layer (fully cure or semicure). From the viewpoint of improving the bondability between the photocuring resin composition (A) layer and the photocuring resin composition (C) layer or improving the processability of the photocuring laminated sheet obtained, the method of irradiating light on a photocuring sheet obtained by laminating a photocuring resin composition (A) layer and photocuring resin composition (C) layer in the uncured state after insert molding as explained later so as to simultaneously photocure the photocuring resin composition (A) layer and the photocuring resin composition (C) layer is preferable.

To produce a photocuring sheet in a shorter time so as to eliminate the problems caused by the solvent remaining in the photocuring sheet explained above and improve the production efficiency at low cost, it is necessary to strengthen the heating and drying conditions for removal of the solvent to achieve sufficient drying. At this time, however, if the photocuring sheet is heated and dried continuously for more than 20 seconds at a temperature higher than the glass transition temperature of the resin ingredient (b) of the main ingredient of the substrate sheet (B), the photocuring sheet will end up being drawn by a slight tension. Not only will the thickness of the photocuring resin composition (A) layer or substrate sheet (B) become smaller, but also the mar resistance, surface hardness, etc. of the photocuring resin composition (A) after photocuring will sometimes fall. Here, the resin ingredient (b) of the main ingredient of the substrate sheet (B) means the resin ingredient with the highest ratio of composition in the resin ingredients making up the substrate sheet (B). The heating and drying conditions of the photocuring sheet are heating and drying at a temperature not over the glass transition temperature of the resin ingredient (b) or when, drying at a temperature higher than the glass transition temperature of the resin ingredient (b), drying at less than the glass transition temperature of the resin ingredient (b) plus 10° C., preferably less than the temperature plus 5° C., and making the heating and drying time at that temperature not more than 20 seconds, preferably not more than 10 seconds, more preferably not more than 5 seconds.

As the dryer, when using a flammable organic solvent as the solvent, from the viewpoint of safety, it is possible to use one provided with an air heating type of heat source using steam. It is possible to use a system of bringing hot air in the dryer into contact by a counter flow and the system of blowing the hot air on the photocuring sheet by nozzles. The shape of the dryer may be selected from known ones such as the arch type, flat type, etc. in accordance with the objective.

When coating the above resin solution on a substrate sheet comprised of a polyolefin such as polyethylene or polypropylene, to improve the bondability between the substrate sheet and the photocuring resin composition, it is preferable to (1) coat a primer comprised of a low molecular weight polyolefin etc. on the substrate sheet in advance or (2) activate the substrate surface by corona discharge etc. (the step for the corona discharge is preferably just before coating since the bondability is higher right after activation). Further, the photocuring resin composition shrinks in volume at the time of photocuring. To prevent a decline in bondability with the substrate sheet, it is preferable to laminate a primer layer.

The photocuring sheet of the present invention can be made a photocuring decorative sheet by providing a printed layer at the substrate sheet side.

The printed layer decorates the surface of the insert molded article with a pattern, letters, etc. The decoration is arbitrary, but for example patterns simulating wood, stone, fabric, and sand and patterns comprised of geometric shapes, letters, etc. may be mentioned. As the material of the printed layer, a colored ink containing a resin such as a polyvinyl-based resin such as a vinyl chloride/vinyl acetate-based copolymer, polyamide-based resin, polyester-based resin, polyacryl-based resin, polyurethane-based resin, polyvinyl acetal-based resin, polyester urethane-based resin, cellulose ester-based resin, alkyd resin, or chlorinated polyolefin-based resin as a binder and a pigment or dye of a suitable color as a coloring agent may be used.

As the pigment of the ink usable for the printed layer, for example, the following may be used. Normally, as the pigment, a yellow pigment such as an azo-based pigment such as polyazo, an organic pigment such as isoindolinone, or an inorganic pigment such as Yellow Lead, a red pigment such as an azo-based pigment such as polyazo, an organic pigment such as quinacridone, or an inorganic pigment such as Red Iron Oxide, a blue pigment such as an organic pigment such as Phthalocyanine Blue or an inorganic pigment such as Cobalt Blue, a black pigment such as an organic pigment such as Aniline Black, and a white pigment such as an inorganic pigment such as titanium dioxide may be used.

As the dye of the ink usable in the printed layer, various known types of dyes may be used to an extent not detracting from the effects of the present invention.

Further, as the method of printing the ink, it is possible to use a known printing method such as offset printing, gravure rotary printing, or screen printing or a known coating method such as roll coating or spray coating. At that time, when not using a low molecular weight crosslinking compound, but using a photocuring resin composition of a composition causing the polymers to crosslink as in the present invention, there is no surface tackiness, there is little trouble at the time of printing, and the yield is excellent.

Further, to decorate the surface of the insert molded article, it is possible to provide a deposited layer instead of the printed layer or possible to provide both a printed layer and deposited layer.

The deposited layer may be formed by the method of vacuum deposition, sputtering, ion plating, gilding, etc. using at least one metal selected from the group comprised of aluminum, nickel, gold, platinum, chrome, iron, copper, indium, tin, silver, titanium, lead, and zinc or an alloy or compound of the same.

The thickness of the printed layer or deposited layer for decoration may be suitably selected in accordance with the degree of elongation at the time of insert molding so as to obtain the desired surface appearance of the inserted molded article.

Further, the photocuring sheet of the present invention may be made a photocuring insert molding sheet formed at its substrate sheet side with a printed layer and/or deposited layer, bonding layer, and, in accordance with need, primer layer. In this case, the preferable range of thickness of the photocuring insert molding sheet is 30 to 750 $\mu$m. If the sheet thickness is less than 30 $\mu$m, when deep drawing, the thickness of the sheet at the curved surfaces remarkable falls and as a result the sheet physical properties such as the mar resistance or chemical resistance sometimes falls. Further, when the sheet thickness is over 750 $\mu$m, the ability to follow the shape of the mold sometimes falls.

The bonding layer may be selected from any synthetic resin material so long as it improves the bondability between the printed layer or deposited layer and molding resin or the printed layer or deposited layer and primer sheet. For example, when the molding resin is a polyacryl-based resin, a polyacryl-based resin should be used. Further, when the molding resin is a polyphenylene oxide polystyrene-based resin, polycarbonate-based resin, styrene copolymer-based resin, or polystyrene-based blended resin, a polyacryl-based resin, polystyrene-based resin, polyamide-based resin, etc. having affinity with these resins may be used. Further, when the molding resin is a polyolefin-based resin such as a polypropylene-based resin, a chlorinated polyolefin resin, chlorinated ethylene-vinyl acetate copolymer resin, cyclized rubber, coumarone-indene resin, or a heat curing urethane resin using block isocyanate may be used. Note that to reduce the tackiness of the bonding layer or improve the heat resistance, it is also possible to further include a hydrophobic silica or epoxy resin, petroleum resin, etc.

The above primer sheet is formed in accordance with need. It is possible to use a known resin such as a urethane resin. Note that for the purpose of improving the bondability with a molding resin, it may be comprised of a material compatible with the molding resin. In practice, the primer sheet is comprised of the same polymer material as the molding resin. Further, the existence of the primer sheet has the advantage of minimizing the propagation of surface defects of the injection molded article to the photocuring resin composition. In this case, the primer sheet has to have enough of a thickness to absorb surface defects of the molding resin while giving a completely smooth top surface of the photocuring resin composition.

Further, the photocuring sheet of the present invention may further have a cover film provided on the photocuring resin composition (A) layer on the substrate sheet (B). This cover film is effective for dust-proofing the photocuring sheet surface. Further, it is effective for prevent scratching of the photocuring resin composition (A) layer before irradiating it with an active energy beam.

The cover film is bonded to the photocuring resin composition (A) layer before the insert molding as explained later and is immediately peeled off at the time of insert molding, so has to have a suitable bondability and an excellent release property with respect to the photocuring resin composition (A) layer. If a film satisfying this condition, it is possible to select any film for use. As such a film, for example, a polyethylene-based film, polypropylene-based film, polyester-based film, etc. may be mentioned.

In the case of a shaped article such as a body panel or spoiler of an automobile which is large in size and small in thickness, the problem arises that the gas produced from the molding resin remains in the molding resin, the air in the mold easily is entrained between the molding resin and the sheet, and the bondability of the sheet to the molding resin falls. In such a case, by providing a layer having gas permeability on the sheet surface in contact with the molding resin, the problem can be solved. As such a layer having gas permeability, it is possible to mention a woven fabric or nonwoven fabric comprised of Spandex, acryl fiber, polyethylene-based fiber, polyamide-based fiber, etc. Further, instead of a woven fabric/nonwoven fabric, it is possible to use one comprised of a foam layer. As the method of forming a foam layer, the method of coating a resin solution containing a known foaming agent, then causing it to foam by heating etc. and form continuous pores may be mentioned.

Next, an example of the method of production of an insert molded article using the above photocuring sheet, photocuring decorative sheet, and photocuring insert molding sheet will be explained.

First, when a cover film is provided on the photocuring sheet, photocuring decorative sheet, or photocuring insert molding sheet, the cover film is peeled off from the sheet. Note that the cover film may be peeled off right before inserting and arranging the sheet in the mold or may be peeled off well before inserting and arranging the sheet in the mold. Considering the dust-proofing of the photocuring resin composition (A) layer before irradiation of light and prevention of scratching, the former is preferable.

Next, the photocuring sheet, photocuring decorative sheet, or photocuring insert molding sheet is inserted and arranged so that the photocuring resin composition (A) side faces the inside wall of the mold (that is, the side opposite to the photocuring resin composition (A) layer in contact with the molding resin). At this time, the necessary portion may be fed intermittently in the state as a long sheet (while unwinding it from the roll) or the sheet may be cut and fed one piece at a time. In particular, when using a long sheet having a printed layer or deposited layer for decoration, it is possible to use a feed system having a positioning mechanism to bring the layer for decoration and the mold into register. Further, when intermittently feeding the sheet, by fixing the sheet after detecting the position of the sheet by a sensor, it is possible to fix the sheet at the same position at all times and prevent positional deviation of the decorative layer.

Next, in accordance with need, a photocuring sheet, photocuring decorative sheet, or photocuring insert molding sheet is formed in advance. For example, it is possible to use a hot pack or other heating means to heat the sheet to at least its softening point to soften it and then draw the air out through suction ports provided in the mold so as to make the sheet follow the shape of the mold for preforming. Note that if preheating the sheet to a temperature less than the heat deformation temperature of the sheet in advance before inserting and arranging the sheet in the mold, it is possible to shorten the heating performed after inserting and arranging the sheet in the mold and therefore improve the productivity. Further, it is possible to using three-dimensional molding mold separate from the injection molding mold and preform the sheet to a desired shape by a known molding method such as vacuum molding, pressure molding, pressing molding while pressing heated rubber, and press molding. Of course, it is also possible not to preform the sheet, but use the injection pressure of the molding resin explained later to simultaneously form the sheet and join it with the molding resin. At this time, it is possible to preheat the sheet to soften it.

Next, the mold is closed, the molten state molding resin is injected into the cavity, and the resin is allowed to solidify, whereby a resin shaped article having a photocuring sheet, photocuring decorative sheet, or photocuring insert molding sheet arranged at its surface is formed.

The molding resin used in the present invention is not limited in type. All resins able to be injection molded may be used. As such molding resins, for example, a polyethylene-based resin, polypropylene-based resin, polybutene-based resin, polymethylpentene-based resin, ethylene-propylene copolymer resin, ethylene-propylene-butene copolymer resin, or olefin-based thermoplastic elastomer, or other olefin-based resin, polystyrene-based resin, ABS (acrylonitrile/butadiene/styrene-based copolymer)-based resin, AS (acrylonitrile/styrene-based copolymer)-based resin, acryl-based resin, urethane-based resin, unsaturated polyester-based resin, epoxy-based resin, or other general use thermoplastic or heat curing resin may be mentioned. Further, a polyphenylene oxide-polystyrene-based resin, polycarbonate-based resin, polyacetal-based resin, polycarbonate-modified polyphenylene ether-based resin, polyethylene terephthalate-based resin, or other general use engineering resin or polysulfone-based resin, polyphenylene sulfide-based resin, polyphenylene oxide-based resin, polyetherimide-based resin, polyimide-based resin, liquid crystal polyester-based resin, polyaryl-based heat resistant resin, or other super engineering resin may be used. Further, a composite resin or various types of modifying resins including a reinforcing material such as glass fiber or inorganic fiber (talc, calcium carbonate, silica, mica, etc.) or a modifying agent such as a rubber ingredient may be used. Note that by making the shrinkage rate of the molding resin after molding close to the shrinkage rate of the sheet, it is possible to eliminate trouble such as warping of the insert molded article or peeling of the sheet.

Finally, the insert molded article is taken out from the mold, then irradiated with light to photocure the photocuring resin composition on the surface of the molded article.

As the light irradiated, an electron beam, UV light, gamma rays, etc. may be mentioned. The irradiation conditions are set in accordance with the photocuring properties of the photocuring resin composition (A) layer and, in accordance with need, the photocuring resin (C) layer. The amount of irradiation is normally about 500 to 2000 mJ/cm$^2$. According to this, the photocuring resin composition (A) and/or the photocuring resin composition (C) is cured and it is possible to obtain an insert molded article having a hard coating formed on its surface.

The unnecessary portion of the photocuring sheet, photocuring decorative sheet, or photocuring insert molding sheet bonded to the insert molded article is suitably trimmed and removed in accordance with need. This trimming can be performed after inserting and arranging the sheet in the mold, before irradiating light on the insert molded article, or after irradiating light. As the method of trimming, the trimming may be performed by a known method such as the method of irradiating laser light etc. to burn off the sheet, the method of preparing a punch die for the trimming and punching out the sheet by pressing, and the method of removal by tearing the sheet by hand.

Note that as the method for producing an insert molded article, the explanation was given of the method of production using injection molding, but it is also possible to use blow molding instead of injection molding.

Further, when a molded article decorated by a photocuring insert molding sheet of the present invention is used mainly outdoors, it is possible to add a UV absorbent or photo stabilizer to the sheet. As a UV absorbent, an organic substance such as benzotriazole, benzophenone, or salicylic acid ester or an inorganic substance such as zinc oxide, cerium oxide, or titanium oxide of a particulate of a particle size of not more than 0.2 μm may be used. Further, as a photo stabilizer, it is possible to use a radical trapping agent such as a hindered amine-based radical trapping agent or a piperidine-based radical trapping agent such as bis(2,2,6,6-tetramethyl-4-piperidinyl)sebacate.

The molded article obtained in this way is given color or a design at the same time as the molding. Further, the abrasion resistance, chemical resistance, weather resistance, etc. are improved by irradiation by light for a short time. Further, compared with the conventional spray coating after molding, the process can be shortened, the yield improved, and the impact on the environment reduced.

Further, the photocuring sheet of the present invention may be used laminated on a product already molded by injection molding etc. directly or through a bonding layer and thereby used laminated on the surface of the molded article.

The present invention will be explained in detail below with reference to examples. Note that the "parts" are "parts by weight".

SYNTHESIS EXAMPLE 1

Synthesis of Thermoplastic Resin A Having Radical Polymerizing Unsaturated Group at its Side Chain 50 parts of methylethylketone (boiling point 79.6° C., hereinafter abbreviated as "MEK") was introduced into a 1-liter four-neck flask provided with a nitrogen introduction port, a stirrer, a condenser, and a thermometer and raised in temperature to 80° C. A mixture of 41.3 parts of methyl methacrylate (hereinafter abbreviated as "MMA"), 58.7 parts of glycidyl methacrylate (hereinafter referred to as "GMA"), 0.5 part of azobisisobutyronitrile (hereinafter referred to as "AIBN"), and 2 parts of n-octylmercaptan (hereinafter referred to as "nOSH") was added dropwise over 3 hours in a nitrogen atmosphere. Next, a mixture of 80 parts of MEK and 0.2 part of AIBN was added to cause polymerization. After 4 hours, 50 parts of MEK, 0.5 part of hydroquinone monomethylether (hereinafter referred to as "MEHQ"), 2.5 parts of triphenylphosphine (hereinafter referred to as "TPP"), and 29.4 parts of acrylic acid (hereinafter referred to as "AA",) were added and the mixture stirred for 30 hours at 80° C. while blowing in dry air. Next, the mixture was cooled, then the reaction product was taken out from the flask to obtain a solution of the thermoplastic resin A having a radical polymerizing unsaturated group at its side chain.

The polymerization rate of the monomer in the thermoplastic resin A was at least 99.5%, the polymer solid content was about 42 wt %, the number average molecular weight was about 15,000, the glass transition temperature was about 54° C., and the double bond equivalent was an average 316 g/mol.

SYNTHESIS EXAMPLE 2

Synthesis of Thermoplastic Resin B Having Radical Polymerizing Unsaturated Group at Its Side Chain 50 parts of MEK was introduced into a 1-liter four-neck flask provided with a nitrogen introduction port, a stirrer, a condenser, and a thermometer and raised in temperature to 80° C. A mixture of 67.8 parts of MMA, 32.2 parts of GMA, and 0.5 part of AIBN was added dropwise over 3 hours in a nitrogen atmosphere. Next, a mixture of 80 parts of MEK and 0.2 part of AIBN was added to cause polymerization. After 4 hours, 50 parts of MEK, 0.5 part of MEHQ, 2.5 parts of TPP, and 16.1 parts of AA were added and the mixture stirred for 30 hours at 80° C. while blowing in dry air. Next, the mixture was cooled, then the reaction product was taken out from the flask to obtain a solution of the thermoplastic resin B having a radical polymerizing unsaturated group at its side chain.

The polymerization rate of the monomer in the thermoplastic resin B was at least 99.5%, the polymer solid content was about 40 wt %, the number average molecular weight was about 60,000, the glass transition temperature was about 77° C., and the double bond equivalent was an average 519 g/mol.

SYNTHESIS EXAMPLE 3

Synthesis of Thermoplastic Resin C Having Radical Polymerizing Unsaturated Group at Its Side Chain 50 parts of MEK was introduced into a 1-liter four-neck flask provided with a nitrogen introduction port, a stirrer, a condenser, and a thermometer and raised in temperature to 80° C. A mixture of 19 parts of MMA, 81 parts of GMA, and 0.5 part of AIBN was added dropwise over 3 hours in a nitrogen atmosphere. Next, a mixture of 80 parts of MEK and 0.2 part of AIBN was added to cause polymerization. After 4 hours, 50 parts of MEK, 0.5 part of MEHQ, 2.5 parts of TPP, and 40.6 parts of AA were added and the mixture stirred for 30 hours at 80° C. while blowing in dry air. Next, the mixture was cooled, then the reaction product was taken out from the flask to obtain a solution of the thermoplastic resin C having a radical polymerizing unsaturated group at its side chain.

The polymerization rate of the monomer in the thermoplastic resin C was at least 99.5%, the polymer solid content was about 44 wt %, the number average molecular weight was about 54,000, the glass transition temperature was about 41° C., and the double bond equivalent was an average 249 g/mol.

SYNTHESIS EXAMPLE 4

Synthesis of Thermoplastic Resin D Having Radical Polymerizing Unsaturated Group at Its Side Chain 50 parts of MEK was introduced into a 1-liter four-neck flask provided with a nitrogen introduction port, a stirrer, a condenser, and a thermometer and raised in temperature to 80° C. A mixture of 100 parts of GMA and 0.5 part of AIBN was added dropwise over 3 hours in a nitrogen atmosphere. Next, a mixture of 80 parts of MEK and 0.2 part of AIBN was added to cause polymerization. After 4 hours, 50 parts of MEK, 0.5 part of MEHQ, 2.5 parts of TPP, and 50.1 parts of AA were added and the mixture stirred for 30 hours at 80° C. while blowing in dry air. Next, the mixture was cooled, then the reaction product was taken out from the flask to obtain a solution of the thermoplastic resin D having a radical polymerizing unsaturated group at its side chain.

The polymerization rate of the monomer in the thermoplastic resin D was at least 99.5%, the polymer solid content was about 46 wt %, the number average molecular weight was about 50,000, the glass transition temperature was about 32° C., and the double bond equivalent was an average 216 g/mol.

SYNTHESIS EXAMPLE 5

Synthesis of Thermoplastic Resin E Having Radical Polymerizing Unsaturated Group at Its Side Chain 50 parts of MEK was introduced into a 1-liter four-neck flask provided with a nitrogen introduction port, a stirrer, a condenser, and a thermometer and raised in temperature to 80° C. A mixture of 20.4 parts of MMA, 79.6 parts of 2-hydroxyethyl methacrylate, and 0.5 part of AIBN was added dropwise over 3 hours in a nitrogen atmosphere. Next, a mixture of 80 parts of MEK and 0.2 part of AIBN was added to cause polymerization. After 4 hours, the temperature was lowered to 60° C., then 50 parts of MEK, 0.5 part of MEHQ, 0.05 part of dibutyltin dilaurate, and 93.9 parts of 2-methacryloyloxyethylisocyanate (made by Showa Denko, name of product: Karenz MOI) were added and the mixture stirred for 30 hours at 60° C. while blowing in dry air. Next, the mixture was cooled, then the reaction product was taken out from the flask to obtain a solution of the thermoplastic resin E having a radical polymerizing unsaturated group at its side chain.

The polymerization rate of the monomer in the thermoplastic resin E was at least 99.5%, the polymer solid content was about 52 wt %, the number average molecular weight was about 32,000, the glass transition temperature was about 31° C., and the double bond equivalent was an average 320 g/mol.

SYNTHESIS EXAMPLE 6

Synthesis of Thermoplastic Resin F Having Alicyclic Epoxy Group in Side Chain 100 parts of Cyclomer M100 (3,4-epoxycyclohexylmethacrylate, made by Daicel Chemical Industries), 60 parts of MEK, and 0.3 part of AIBN were introduced into a 1-liter four-neck flask provided with a nitrogen introduction port, a stirrer, a condenser, and a thermometer in a nitrogen atmosphere. The temperature of the hot water bath was raised to 75° C. while stirring and polymerization caused at that temperature for 2 hours. Next, 0.7 part of AIBN was added divided into five portions every other hour, then the temperature inside the flask was raised to the boiling point of the solvent and polymerization continued at that temperature for a further 2 hours. Next, after the temperature inside the flask fell to under 50° C., 90 parts of MEK were added, the polymerization reaction product was taken out from the flask, and a solution of a thermoplastic resin F having an alicyclic epoxy group at its side chain was obtained.

The polymerization rate of the monomer in the thermoplastic resin F was at least 99.5%, the polymer solid content was about 40 wt %, the number average molecular weight was about 30,000, and the glass transition temperature was about 73° C.

TABLE 1

Example 1 of Surface Treatment of Colloidal Silica (Preparation of Surface Treated Colloidal Silica S1)

| | |
|---|---|
| IPA-ST[1] | 1 |
| KBM503[2] | 0.1 |
| Water | 0.3 |

Note: The figures are moles converted to solid content.
[1]IPA-ST: isopropanol dispersed colloidal silica sol (made by Nissan Chemical Industries), silica particle size = 15 nm
[2]KBM503: γ-methacryloyloxypropyltrimethoxysilane (made by Shin-Etsu Chemical Industry), molecular weight = 248

The ingredients listed in Table 1 were charged into a flask provided with a stirrer, condenser, and thermometer, the temperature of the hot water bath was raised to 75° C. while stirring, and the ingredients were reacted at that temperature for 2 hours, whereby colloidal silica dispersed in isopropanol and having a surface treated by a silane compound was obtained. Next, the isopropanol was distilled off, then toluene (boiling point 110.6° C.) was added. This was repeated. By completely substituting the isopropanol with toluene, colloidal silica S1dispersed in toluene and having a surface treated by a silane compound was obtained.

TABLE 2

Example 2 of Surface Treatment of Colloidal Silica (Preparation of Surface Treated Colloidal Silica S2)

| | |
|---|---|
| MEK-ST[1] | 1 |
| KBM503[2] | 0.1 |
| Water | 0.3 |

Note: The figures are moles converted to solid content.
[1]MEK-ST: MEK dispersed colloidal silica sol (made by Nissan Chemical Industries), silica particle size = 15 nm
[2]KBM503: γ-methacryloyloxypropyltrimethoxysilane (made by Shin-Etsu Chemical Industry), molecular weight = 248

The ingredients listed in Table 2 were charged into a flask provided with a stirrer, condenser, and thermometer, the temperature of the hot water bath was raised to 75° C. while stirring, and the ingredients were reacted at that temperature for 2 hours, whereby colloidal silica S2 dispersed in MEK and having a surface treated by a silane compound was obtained.

EXAMPLES 1 TO 2 AND COMPARATIVE EXAMPLES 1 TO 3

Photocuring resin solutions having the compositions shown in Table 3 were prepared using the thermoplastic resins A to F synthesized by the above method, surface-treated colloidal silica S1 and S2, and the compounds of Table 3.

TABLE 3

| | Examples | | Comparative Examples | | |
|---|---|---|---|---|---|
| | 1 | 2 | 1 | 2 | 3 |
| Thermoplastic resin A | 166 | | 149 | | |
| Thermoplastic resin B | | 100 | | 90 | |
| Thermoplastic resin C | | | | | |
| Thermoplastic resin D | | | | | |
| Thermoplastic resin E | | | | | |
| Thermoplastic resin F | | | | | 166 |
| Crosslinking compound[1] | | | 17 | 10 | |
| Photopolymerization initiator i[2] | 5 | 3 | 5 | 3 | |
| Photopolymerization initiator ii[3] | | | | | 2 |
| Colloidal silica S1 | | 66 | | 66 | |
| Colloidal silica S2 | | | | | |

Note: The figures are parts by weight converted to solid content.
[1]Trimethylolpropane triacrylate
[2]1-hydroxycyclohexylphenyl ketone
[3]Triphenylsulfonium hexafluoride antimonate Each of these photocuring resin solutions was stirred by a propeller type mixer and coated on a transparent soft acrylic sheet A (weight ratio of methylmethacrylate/n-butylacrylate copolymer: crosslinked rubber=80:20, glass transition temperature of methylmethacrylate/n-butylacrylate copolymer: 105° C.) of a thickness of 125 μm including a crosslinked rubber ingredient as a substrate sheet by a comma roll coater to a width of 350 mm. Next, this was passed through a tunnel type dryer (width 800 mm, height 100 mm, length 8 m, divided into four drying zones (length of one zone: 2 m), hot air blown in so as to form a counter flow to the movement of the sheet) set to a temperature condition of the following Table 4 at a speed of 10 m/min to evaporate the solvent and form a photocuring resin layer of a thickness of 8 μm. The residence time in each drying zone at this time is shown in Table 4.

TABLE 4

|  | Drying zone 1 | Drying zone 2 | Drying zone 3 | Drying zone 4 |
|---|---|---|---|---|
| Temperature (° C.) | 50 | 60 | 80 | 100 |
| Residence time (sec) | 12 | 12 | 12 | 12 |

Next, each sheet was slit to a width of 300 mm and wrapped in a roll on an ABS core in a length of 20 m. Note that when the elongation at break of the transparent soft acrylic sheet A was measured by a Tensilon, the elongation at break when heating to 100° C. was 260%.

Each of the photocuring insert molding sheets was cut to a size of 10 cm×10 cm and weighed, then immersed in 20 ml of N,N-dimethylformamide (containing methylisobutylketone as an internal standard) and allowed to stand overnight while stirring. The solution after standing overnight was analyzed by gas chromatography and the total amount of the methylethylketone and toluene remaining in the photocuring resin composition was measured. The results are shown in Table 5.

Further, this was stored at room temperature for about 2 weeks in a roll state, then evaluated for surface tackiness while being unwound. The results are shown in Table 5.

Each of these photocuring insert molding sheets was arranged in a mold so that the photocuring resin composition faced the inside wall of the mold, the sheet was preheated for 10 seconds by an infrared heater of a temperature of 350° C., then the sheet was made to follow the shape of the mold by vacuum suction while heating. Note that the mold was shaped as a truncated pyramid. The truncated top surface had a size of 100 mm×100 mm, the bottom surface had a size of 108 mm×117 mm, the depth was 10 mm, and the radius of curvature of the end of the truncated top surface was 3, 5, 7, or 10 mm. The ability to follow the mold shape was evaluated visually, whereby the ends were all followed the mold well.

Next, a polycarbonate resin was insert molded as a resin under conditions of a molding temperature of 280 to 300° C. and a mold temperature of 40 to 60° C. to obtain an insert molded article with a photocuring insert molding sheet bonded to the surface of the molded article. The contamination of the mold at this time was evaluated visually. The results are shown in Table 5.

Next, an ultraviolet lamp was used to irradiate ultraviolet light of about 700 mJ/cm$^2$ to cause the photocuring resin composition to cure, then the surface physical properties were evaluated. The results are shown in Table 5.

Method of Evaluation of Physical Properties of Sheet

Acid Resistance

The appearance after a spot test of a 47 wt % aqueous solution of sulfuric acid at 40° C. for 3 hours was visually evaluated.

G (good): Good
F (fair): Light scars
P (poor): Remarkable scars
Warm Water Resistance The state of the sheet after immersion in warm water of 80° C. for 24 hours was visually evaluated.

G (good): Good
F (fair): Light whitening
P (poor): Remarkable whitening
Transparency The total light transmittance and haze were measured in accordance with ASTM D1003 using a haze meter.

Abrasion Resistance

The haze value after a taper abrasion test (single side 500 g load, use of CS-1OF abrasion ring, 60 rpm rotational speed, test conducted 100 times and 500 times) was measured by a hazeometer. The value expressed by (haze value after test)−(haze value before test) was given as the abrasion resistance (%).

Weather Resistance

The appearance when conducting an exposure test for 1500 hours and 2000 hours at a cycle of drying for 48 minutes and rain for 12 minutes using a Sunshine Weather Meter (made by Suga Shikenki) was visually evaluated.

G (good): Good
P (Poor): Whitening or cracking
Bondability

This was evaluated by the cross-cut tape method in accordance with JIS K5400.

TABLE 5

|  | Examples | | Comparative Examples | | |
|---|---|---|---|---|---|
|  | 1 | 2 | 1 | 2 | 3 |
| Uncured sheet |  |  |  |  |  |
| Tackiness[1] | G | G | P | P | G |
| Mold contamination[2] | G | G | P | P | G |
| Amount of solvent (X)[3] | 1.5 | 1.8 | 1.7 | 1.8 | 1.3 |
| Insert molded article |  |  |  |  |  |
| Acid resistance | G | G | Molding not possible | Molding not possible | G |
| Warm water resistance | G | G |  |  | F |
| Total light transmittance (%) | 91 | 90 | (sticking to mold) | (sticking to mold) | 90 |
| Haze (%) | 0.7 | 0.8 |  |  | 0.8 |
| Abrasion resistance (%)[4] (100X) | 10 | 8 |  |  | 18 |
| Abrasion resistance (%)[4] (500X) | 35 | 15 |  |  | 30 |
| Weather resistance (1500 hours) | G | G |  |  | P |
| Weather resistance (2000 hours) | G | G |  |  | P |
| Bondability | No peeling | No peeling |  |  | Peeling |

[1]G (good): no tackiness, F (fair): tackiness, P (poor): increased tackiness and unrolling impossible
[2]G (good): no contamination, F (fair): some contamination, P (poor): increased contamination
[3]Total amount of methylethylketone and toluene in photocuring resin composition per unit weight of photocuring sheet
[4]The abrasion resistance of the molded article formed by insert molding only a transparent soft acryl sheet A not having the photocuring resin layer of the present invention was 32% (100 times) and 50% (500 times).

EXAMPLES 3 TO 5 AND COMPARATIVE EXAMPLES 4 TO 6

Photocuring resin solutions for the outermost layer and inner layer having the compositions shown in Table 6 were prepared using the thermoplastic resins A to F synthesized by the above methods, the surface treated colloidal silica S1 and S2, and the compounds of Table 6.

TABLE 6

|  | Examples | | | Comp. Examples | | |
| --- | --- | --- | --- | --- | --- | --- |
|  | 3 | 4 | 5 | 4 | 5 | 6 |
| Outermost layer | | | | | | |
| Thermoplastic resin A | | | | | | |
| Thermoplastic resin B | | | | | | |
| Thermoplastic resin C | | | | | | |
| Thermoplastic resin D | 166 | 100 | | 149 | 90 | |
| Thermoplastic resin E | | | 100 | | | |
| Thermoplastic resin F | | | | | | 166 |
| Crosslinking compound[1] | | | | 17 | 10 | |
| Photopolymerization initiator i[2] | 5 | 3 | 3 | 5 | 3 | |
| Photopolymerization initiator ii[3] | | | | | | 2 |
| Colloidal silica S1 | | 66 | | | 66 | |
| Colloidal silica S2 | | | 66 | | | |
| Inner layer | | | | | | |
| Thermoplastic resin A | | | | | | |
| Thermoplastic resin B | 166 | 133 | 157 | 166 | 133 | 166 |
| Thermoplastic resin C | | | | | | |
| Thermoplastic resin D | | | | | | |
| Thermoplastic resin E | | | | | | |
| Thermoplastic resin F | | | | | | |
| Crosslinking compound[1] | | | | | | |
| Photopolymerization initiator i[2] | 5 | 4 | 5 | 5 | 4 | 5 |
| Photopolymerization initiator ii[3] | | | | | | |
| Colloidal silica S1 | | 33 | | | 33 | |
| Colloidal silica S2 | | | 9 | | | |

Notes: The figures are parts by weight converted to solid content.
[1]Trimethylolpropane triacrylate
[2]1-hydroxycyclohexylphenylketone
[3]Triphenylsulfonium hexafluoride antimonate Each of the prepared photocuring resin solutions for the inner layer was coated and dried on a transparent soft acrylic sheet A to a width of 350 mm in the same way as Example 1 to form a photocuring resin layer (inner layer) of a thickness of 8 μm. Next, the prepared photocuring resin solution for the outermost layer was stirred by a propeller type mixer, coated and dried on the previously formed photocuring resin layer (inner layer) to a width of 350 mm in the same way as Example 1 to form a photocuring resin layer (outermost layer) of a thickness of 8 μm to thereby prepare a photocuring sheet.

Next, each sheet was slit to a width of 300 mm and wrapped in a roll state around an ABS core at a length of 20 m. Note that if measuring the elongation at break of only the transparent soft acrylic sheet A by a Tensilon, the elongation at break at the time of heating of 100° C. was 260%.

This was then stored at room temperature in the rolled state for about 2 weeks, then was evaluated for the tackiness of the surface while unrolling it. The results are shown in Table 7.

The photocuring sheet was arranged in a mold so that the outermost layer of the photocuring resin composition faced the inside wall of the mold, the sheet was preheated for 10 seconds by an infrared heater of a temperature of 350° C., then the sheet was made to follow the shape of the mold by vacuum suction while heating. Note that the mold was shaped as a truncated pyramid. The truncated top surface had a size of 100 mm×100 mm, the bottom surface had a size of 108 mm×117 mm, the depth was 10 mm, and the radius of curvature of the end of the truncated top surface was 3, 5, 7, or 10 mm. The ability to follow the mold was evaluated visually, whereby the ends all followed the mold well.

Next, a polycarbonate was insert molded as a resin under conditions of a molding temperature of 280 to 300° C. and a mold temperature of 40 to 60° C. to obtain an insert molded article with a photocuring insert molding sheet bonded to the surface of the molded article. The contamination of the mold at this time was evaluated visually. The results are shown in Table 7.

Next, an ultraviolet lamp was used to irradiate ultraviolet light of about 700 mJ/cm$^2$ to cause the outermost layer and innermost layer photocuring resin compositions to cure, then the surface physical properties were evaluated. The results are shown in Table 7.

TABLE 7

|  | Examples | | | Comp. Examples | | |
| --- | --- | --- | --- | --- | --- | --- |
|  | 3 | 4 | 5 | 4 | 5 | 6 |
| Uncured sheet | | | | | | |
| Tackiness[1] | G | G | G | P | P | G |
| Mold contamination[2] | G | G | G | P | P | G |
| Insert molded article | | | | | | |
| Acid resistance | G | G | G | Molding not possible | Molding not possible | G |
| Warm water resistance | G | G | G | possible (sticking to mold) | possible (sticking to mold) | F |
| Total light transmittance (%) | 90 | 91 | 91 | | | 90 |
| Haze (%) | 1.1 | 1.4 | 1.2 | | | 1.2 |
| Abrasion resistance (%)[3] (100X) | 2 | 1 | 2 | | | 18 |
| Abrasion resistance (%) (500X) | 8 | 2 | 5 | | | 28 |
| Weather resistance (1500 hours) | G | G | G | | | P |
| Weather resistance (2000 hours) | G | G | G | | | P |
| Bondability | No peeling | No peeling | No peeling | | | Peeling |

[1]G (good): no tackiness, F (fair): tackiness, P (poor): increased tackiness and unrolling impossible
[2]G (good): no contamination, F (fair): some contamination, P (poor): increased contamination
[3]The abrasion resistance of the molded article formed by insert molding only a transparent soft acrylic sheet A not having the photocuring resin layer of the present invention was 32% (100 times) and 50% (500 times).

EXAMPLE 6

In the same way as in Examples 3 to 5, three photocuring resin layers of the inner layer 2, inner layer 1, and outermost layer having the compositions shown in Table 8 are successively laminated in that order to prepare a photocuring sheet.

The photocuring sheet obtained was insert molded in the same way as in Examples 3 to 5, irradiated with UV light, then evaluated for the various physical properties. The results are shown in Table 9.

TABLE 8

|  |  | Example 6 |
|---|---|---|
| Outermost layer | Thermoplastic resin D | 100 |
|  | Colloidal silica S1 | 66 |
|  | Photopolymerization initiator i[1] | 3 |
| Inner layer 1 | Thermoplastic resin C | 147 |
|  | Colloidal silica S1 | 19 |
|  | Photopolymerization initiator i[1] | 5 |
| Inner layer 2 | Thermoplastic resin B | 166 |
|  | Photopolymerization initiator i[1] | 5 |

Note) The numerical values are parts by weight converted to solid content.
[1] 1-hydroxycyclohexylphenylketone

TABLE 9

|  | Example 6 |
|---|---|
| Uncured sheet |  |
| Tackiness[1] | G |
| Mold contamination[2] | G |
| Insert molded article |  |
| Acid resistance | G |
| Warm water resistance | G |
| Total light transmittance (%) | 90 |
| Haze (%) | 1.8 |
| Abrasion resistance (%)[3] (100X) | 1 |
| Abrasion resistance (%)[3] (500X) | 3 |
| Weather resistance (1500 hours) | G |
| Weather resistance (2000 hours) | G |
| Bondability | No peeling |

[1] G (good): no tackiness, F (fair): tackiness, P (poor): increased tackiness and unrolling impossible
[2] G (good): no contamination, F (fair): some contamination, P (poor): increased contamination
[3] The abrasion resistance of the molded article formed by insert molding only a transparent soft acrylic sheet A not having the photocuring resin layer of the present invention was 32% (100 times) and 50% (500 times).

EXAMPLES 7 TO 8

Photocuring resin solutions having the compositions shown in Table 10 were prepared using the thermoplastic resins A to F synthesized by the above methods, the surface treated colloidal silica S1 and S2, and the compounds of Table 10.

TABLE 10

|  | Examples | |
|---|---|---|
|  | 7 | 8 |
| Thermoplastic resin A | 50 | 30 |
| Photopolymerization initiator i[1] | 1.5 | 0.9 |
| Antimony-doped tin oxide[2] |  | 50 |
| Tin-doped indium oxide[3] | 50 |  |
| Colloidal silica S1 |  | 20 |

Note: The figures are parts by weight converted to solid content.
[1] 1-hydroxycyclohexylphenylketone
[2] Antimony-doped tin oxide: MEK dispersed sol of antimony-doped tin oxide (made by Ishihara Sangyo Kaisha, product name: SN-100P, solid content 30 wt %, particle size 20 nm)
[3] Tin-doped indium oxide: powder of tin-doped indium oxide (made by Mitsui Metal Industry, product name: Passtran ITO, primary particle size 20 nm)

Each prepared photocuring resin solution was stirred by a planetary gear type ball mill and, in the same way as Example 1, coated on a transparent soft acrylic sheet A of a substrate sheet to a width of 350 mm and heated and dried to form a photocuring resin layer of a thickness of 8 μm. Next, the sheet was slit to a width of 300 mm and wrapped in a roll state around an ABS core to a length of 20 m. Note that when the elongation at break of only the transparent soft acrylic sheet was measured by a Tensilon, the elongation at break when heating to 100° C. was 260%.

Each sheet was then stored at room temperature in the roll state for about 2 weeks, then was evaluated for the tackiness of the surface while unrolling it. The results are shown in Table 11.

Each photocuring sheet was arranged in a mold so that the outermost layer of the photocuring resin composition faced the inside wall of the mold, the sheet was preheated for 10 seconds by an infrared heater of a temperature of 350° C., then the sheet was made to follow the shape of the mold by vacuum suction while heating. Note that the mold was shaped as a truncated pyramid. The truncated top surface had a size of 100 mm×100 mm, the bottom surface had a size of 108 mm×117 mm, the depth was 10 mm, and the radius of curvature of the end of the truncated top surface was 3, 5, 7, or 10 mm. The ability to follow the mold shape was evaluated visually, whereby the ends were all tracked well.

Next, a polycarbonate resin was insert molded as a resin under conditions of a molding temperature of 280 to 300° C. and a mold temperature of 40 to 60° C. to obtain an insert molded article with a photocuring insert molding sheet bonded to the surface of the molded article. The contamination of the mold at this time was evaluated visually. The results are shown in Table 11.

Next, an ultraviolet lamp was used to irradiate ultraviolet light of about 700 mJ/cm² to cause the photocuring resin composition to cure, then the surface physical properties were evaluated. The results are shown in Table 11.

TABLE 11

|  | Examples | |
|---|---|---|
|  | 7 | 8 |
| Uncured sheet |  |  |
| Tackiness[1] | G | G |
| Mold contamination[2] | G | G |
| Insert molded article |  |  |
| Total light transmittance (%) | 91 | 90 |
| Haze (%) | 1.0 | 1.3 |
| Surface resistivity[3] (Ω/□) | 5 × 10⁵ | 2 × 10⁷ |
| Bondability | No peeling | No peeling |

[1] G (good): no tackiness, F (fair): tackiness, P (poor): increased tackiness and unrolling impossible
[2] G (good): no contamination, F (fair): some contamination, P (poor): increased contamination
[3] Surface resistivity: surface resistivity measured using a Hiresta-UP or Loresta-GP (both made by Dia Instrumental) based on JIS K 7194.

EXAMPLES 9 TO 14

The same procedure was followed as in Examples 1 to 6 to prepare photocuring sheets except for making the thickness of the transparent soft acrylic sheet A 200 μm. Next, each was slit to a width of 300 mm and wound in a roll state around an ABS core to a length of 20 m. Note that when the elongation at break of only the transparent soft acrylic sheet was measured by a Tensilon, the elongation at break when heating at 100° C. was 400%.

Next, inks comprised of black, brown, and yellow pigments were used to print a pattern on a transparent soft acrylic sheet by gravure printing to obtain a photocuring insert molding sheet. The photocuring sheets of Examples 9 to 14 had no tackiness, so the printing compatibility was excellent.

Each of these photocuring insert molding sheets was arranged in a mold so that the photocuring resin composition faced the inside wall of the mold, the sheet was preheated for 15 seconds by an infrared heater of a temperature of 300° C., then the sheet was made to follow the shape of the mold by vacuum suction while heating.

Next, an acrylonitrile/butadiene/styrene copolymer resin was insert molded as a resin under conditions of a molding temperature of 220 to 250° C. and a mold temperature of 40 to 60° C. to obtain an insert molded article with a photocuring insert molding sheet bonded to the surface of the molded article.

Next, an ultraviolet lamp was used to irradiate ultraviolet light of about 700 mJ/cm$^2$ to cause the photocuring resin composition to cure so as to obtain a molded article having a high surface hardness, superior luster, printed design, and superior decorativeness.

EXAMPLES 15 TO 20

Photocuring sheets were prepared in the same way as Examples 9 to 14. Next, each was slit to a width of 300 mm and wrapped in a roll state around an ABS core at a length of 20 m. Note that if measuring the elongation at break of only the transparent soft acrylic sheet by a Tensilon, the elongation at break at the time of heating of 100° C. was 400%.

Next, inks comprised of black, brown, and yellow pigments were used to print a pattern on a transparent soft acrylic sheet by gravure printing. The photocuring sheets had no tackiness, so the printing compatibility was excellent.

A bonding layer comprised of chlorinated polypropylene resin (chlorination degree 15%) was formed on the printed surface by gravure printing so as to obtain a photocuring insert molding sheet.

Each of these photocuring insert molding sheets was arranged in a mold so that the photocuring resin composition faced the inside wall of the mold, the sheet was preheated for 15 seconds by an infrared heater of a temperature of 300° C., then the sheet was made to follow the shape of the mold by vacuum suction while heating.

Next, a polypropylene-based resin (containing 20 wt % of talc and containing 10 wt % of ethylene-propylene-based rubber) was insert molded as a resin under conditions of a molding temperature of 200 to 240° C. and a mold temperature of 30 to 60° C. to obtain an insert molded article with a photocuring insert molding sheet bonded to the surface of the molded article.

Next, an ultraviolet lamp was used to irradiate ultraviolet light of about 700 mJ/cm$^2$ to cause the photocuring resin composition to cure so as to obtain a molded article having a high surface hardness and abrasion resistance, superior luster, printed design, and superior decorativeness.

COMPARATIVE EXAMPLES 7 AND 8

In the same way as Example 2, a photocuring resin solution was coated on a transparent soft acrylic sheet A (weight ratio of methylmethacrylate/n-butylacrylate copolymer: crosslinked rubber=80:20, glass transition temperature of methylmethacrylate/n-butylacrylate copolymer: 105° C.) by a comma roll coater to a width of 350 mm. Next, this was passed through a tunnel type drier (width 800 mm, height 100 mm, length 8 m, divided into four drying zones (length of one zone: 2 m), hot air blown in so as to form a counter flow to the movement of the sheet) set to a temperature condition of the following Table 12 at a speed of 10 m/min to evaporate the solvent and form a photocuring resin layer of a thickness of 8 μm. The residence time in each drying zone at this time is shown in Table 12.

Next, a photocuring insert molding sheet and insert molded article were obtained in the same way as in Example 2. The results of the evaluation are shown in Table 13. Note that the photocuring insert molding sheet of Comparative Example 8 was drawn remarkably in the flow direction of the sheet, the photocuring resin layer became a thin 4 μm, and the transparent soft acrylic sheet A of the substrate sheet became a thin 75 μm.

TABLE 12

|  | Drying zone 1 | Drying zone 2 | Drying zone 3 | Drying zone 4 |
|---|---|---|---|---|
| Comparative Example 7 | | | | |
| Temperature (° C.) | 50 | 60 | 70 | 80 |
| Residence time (sec) | 12 | 12 | 12 | 12 |
| Comparative Example 8 | | | | |
| Temperature (° C.) | 50 | 60 | 90 | 120 |
| Residence time (sec) | 12 | 12 | 12 | 12 |

TABLE 13

|  | Comp. Examples | |
|---|---|---|
|  | 7 | 8 |
| Uncured sheet | | |
| Tackiness[1] | P | G |
| Mold contamination[2] | P | G |
| Amount of solvent (X)[3] | 13.7 | 0.8 |
| Insert molded article | | |
| Acid resistance | F | G |
| Warm water resistance | P | G |
| Total light transmittance (%) | 90 (many surface defects) | 90 |
| Haze (%) | 0.7 (many surface defects) | 0.8 |
| Abrasion resistance (%)[3] (100X) | 22 | 22 |
| Abrasion resistance (%)[3] (500X) | 52 | 54 |
| Weather resistance (1500 hours) | P | P |
| Weather resistance (2000 hours) | P | P |
| Bondability | Partial peeling | Partial peeling |

[1]G (good): no tackiness, F (fair): tackiness, P (poor): increased tackiness and unrolling impossible
[2]G (good): no contamination, F (fair): some contamination, P (poor): increased contamination
[3]Total amount of methylethylketone and toluene in photocuring resin composition per unit weight of photocuring sheet
[4]The abrasion resistance of the molded article formed by insert molding only a transparent soft acryl sheet A not having the photocuring resin layer of the present invention was 32% (100 times) and 50% (500 times).

As shown in Table 13, in Comparative Example 7 with a large total amount of methylethylketone and toluene in the photocuring resin composition, the sheet surface has tackiness and defects occur in the storage stability in the roll state. Further, there was remarkable contamination of the mold during molding. On the other hand, in Example 2 with a small total amount of methylethylketone and toluene, there was no surface tackiness, the storage stability and insert moldability were excellent, there was no mold contamination, and the chemical resistance, transparency, abrasion resistance, and weather resistance were excellent.

Further, as shown in Table 13, the photocuring sheet of Comparative Example 8 dried for a long period of time at a temperature higher than the glass transition temperature 105° C. of the methylmethacrylate/n-butylacrylate copolymer of the main ingredient of the transparent soft acrylic sheet A of the substrate sheet had a thinner photocuring resin layer and a remarkably lower abrasion resistance or weather resistance after photocuring. On the other hand, in Example 2 having a drying temperature of the photocuring sheet lower than the glass transition temperature of the methylmethacrylate/n-butylacrylate copolymer of the main ingredient of the transparent soft acrylic sheet A, the abrasion resistance and weather resistance after the photocuring were excellent.

Summarizing the effects of the invention, according to the present invention, a photocuring printed sheet able to be printed with a color or design and having a nontacky surface can be easily obtained. By using this for simultaneous molding at the time of injection molding, it is possible to form a surface on a molded article having color, design, or other decoration and having an excellent appearance, mar resistance, weather resistance, and chemical resistance. This can be used for applications as interior materials of automobiles such as instrument panels, console boxs, meter covers, door lock bezel, steering wheels, power window switch bases, center clusters, and dashboards, applications as exterior materials of automobiles such as weather strips, bumpers, bumper guards, side mudguards, body panels, spoilers, front grilles, strut mounts, wheel caps, center pillars, door mirrors, center ornaments, side molds, door molds, window molds, windows, headlamp covers, taillamp covers, and windguards, applications as front panels, buttons, emblems, surface decorative materials, etc. of AV equipment or home electrical appliances, applications such as housings, display windows, buttons, etc. of mobile phones etc., applications such as external materials of furniture, applications such as interior materials of buildings such as walls, ceilings, and floors, applications such as exterior materials of buildings such as sidings and other walls, fences, roofs, gates, and wind screens, applications such as surface decorative materials of fittings such as window frames, doors, handrails, doorstills, and lintels, applications such as optical members such as various displays, lenses, mirrors, goggles, and window glass, applications such as interior and exterior materials of various vehicles such as trains, aircraft, and ships, and various other applications such as vases, cosmetic containers, small containers, and other various packaging and materials or sundry goods such as giveaways and small objects. Further, compared with the case of coating the surface of a shaped article, it is possible to eliminate several steps, the productivity is good, and the impact on the environment is small.

While the invention has been described with reference to specific embodiment chosen for purpose of illustration, it should be apparent that numerous modifications could be made thereto by those skilled in the art without departing from the basic concept and scope of the invention.

What is claimed is:

1. A photocuring resin composition (A) comprising an acrylic resin (a-1) having a radical polymerizing unsaturated group at its side chain, a photopolymerization initiator (a-2), and an inorganic particulate (a-3) having an average primary particle size of not more than 200 nm, and substantially not comprising a crosslinking compound other than (a-1).

2. A photocuring resin composition as set forth in claim 1, wherein said inorganic articulate (a-3) is colloidal silica.

3. A photocuring sheet comprising a substrate (B) and a layer of a photocuring resin composition (A) as set forth in claim 1 laminated on the same.

4. A photocuring sheet as set forth in claim 3, a value of an amount of solvent (X) in the photocuring resin composition (A) of the following equation (1) is not more than 10:

$$X=Y/(a/(a+b)) \tag{1}$$

where,

X: Amount of solvent in the photocuring resin composition (A) per unit weight of photocuring sheet a: Thickness ($\mu$) of photocuring resin composition (A) layer b: Thickness ($\mu$) of substrate sheet (B)

Y: Amount of solvent per unit weight of photocuring sheet.

5. A photocuring sheet as set forth in claim 3, further comprising at least one layer of photocuring resin composition (C) between the substrate sheet (B) and the layer of the photocuring resin composition (A).

6. A process of production of a photocuring sheet as set forth in claim 3, comprising the steps of coating a mixed solution including a photocuring resin composition (A) and solvent on a substrate sheet (B) and heating the coated substrate sheet (B) to cause the solvent to vaporize, wherein the coated substrate sheet (B) is not heated continuously for 20 seconds or more to a temperature equal to or higher than a glass transition temperature of a resin ingredient (b) comprising a main ingredient of the substrate sheet (B).

7. A photocuring decorative sheet comprising at least one of a printed layer and a deposited layer formed on a substrate sheet (B) side of a photocuring sheet as set forth in claim 3.

8. A photocuring insert molding sheet comprising at least one of a printed layer and a deposited layer, and an adhesive layer formed on a substrate sheet (B) side of a photocuring sheet as set forth in claim 3.

9. A photocuring insert molding sheet comprising at least one of a printed layer and a deposited layer, an adhesive layer, and a primer sheet formed on a substrate sheet (B) side of a photocuring sheet as set forth in claim 3.

10. A process of production of an insert molded article comprising inserting a photocuring sheet comprising a substrate (B) and a layer of a photocuring resin composition (A) comprising a thermoplastic resin (a-1) having a radical polymerizing unsaturated group at its side chain and a photopolymerization initiator (a-2) and substantially not comprising a crosslinking compound other than (a-1) and a photocuring decorative sheet comprising at least one of a printed layer and a deposited layer formed on a substrate sheet (B) side of a photocuring sheet comprising a substrate (B) and a layer of a photocuring resin composition (A) comprising a thermoplastic resin (a-1) having a radical polymerizing unsaturated group at its side chain and a photopolymerization initiator (a-2) and substantially not comprising a crosslinking compound other than (a-1) or photocuring insert molding sheet comprising at least one of a printed layer and a deposited layer, an adhesive layer, and a primer sheet formed on a substrate sheet (B) side of a photocuring sheet comprising a substrate (B) and a layer of a photocuring resin composition (A) comprising a thermoplastic resin (a-1) having a radical polymerizing unsaturated group at its side chain and a photopolymerization initiator (a-2) and substantially not comprising a crosslinking compound other than (a-1) so that the photocuring resin composition sides face inner wail surfaces of a mold;

closing the mold, injecting a molten resin into the mold, and causing the resin to solidify to form a resin molded article with a photocuring sheet, photocuring decorative sheet, or photocuring insert molding sheet arranged on its surface; and irradiating light to photocure the photocuring resin composition on the surface of the molded article.

11. A process of production of an insert molded article comprising inserting a photocuring sheet comprising a substrate (B) and a layer of a photocuring resin composition (A) comprising a thermoplastic resin (a-1) having a radical polymerizing unsaturated group at its side chain and a photopolymerization initiator (a-2) and substantially not comprising a crosslinking compound other than (a-1) and a photocuring decorative sheet comprising at least one of a printed layer and a deposited layer formed on a substrate sheet (B) side of a photocuring sheet comprising a substrate (B) and a layer of a photocuring resin composition (A) comprising a thermoplastic resin (a-1) having a radical polymerizing unsaturated group at its side chain and a photopolymerization initiator (a-2) and substantially not comprising a crosslinking compound other than (a-1) or photocuring insert molding sheet comprising at least one of a printed layer and a deposited layer, an adhesive layer, and a primer sheet formed on a substrate sheet (B) side of a photocuring sheet comprising a substrate (B) and a layer of a photocuring resin composition (A) comprising a thermoplastic resin (a-1) having a radical polymerizing unsaturated group at its side chain and a photopolymerization initiator (a-2) and substantially not comprising a crosslinking compound other than (a-1) so that the photocuring resin composition sides face inner wall surfaces of a mold;

preliminarily molding a photocuring sheet, photocuring decorative sheet, or photocuring insert molding sheet and making the sheets follow the shape of the mold;

closing the mold, injecting a molten resin into the mold, and allowing the resin to solidify to form a resin molded article with a photocuring sheet, photocuring decorative sheet, or photocuring insert molding sheet arranged on its surface; and irradiating light to photocure the photocuring resin composition on the surface of the molded article.

12. An insert molded article obtained by a process of production set forth in claim 10.

13. A photocuring sheet comprising a substrate (B) and a layer of a photocuring resin composition (A) as set forth in claim 2 laminated on the same.

* * * * *